US012582988B2

(12) United States Patent
Crivelli et al.

(10) Patent No.: US 12,582,988 B2
(45) Date of Patent: Mar. 24, 2026

(54) ACTUATION SYSTEMS AND METHODS FOR USE WITH FLOW CELLS

(71) Applicant: ILLUMINA, INC., San Diego, CA (US)

(72) Inventors: Paul Crivelli, San Diego, CA (US); Cyril Delattre, Lyons (FR); Gerald Kreindl, San Diego, CA (US); Wesley A. Cox-Muranami, Middleton, WI (US); Bryan Crane, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 851 days.

(21) Appl. No.: 17/790,058

(22) PCT Filed: Dec. 18, 2020

(86) PCT No.: PCT/US2020/066089

§ 371 (c)(1),
(2) Date: Jun. 29, 2022

(87) PCT Pub. No.: WO2021/138088

PCT Pub. Date: Jul. 8, 2021

(65) Prior Publication Data

US 2023/0031325 A1 Feb. 2, 2023

Related U.S. Application Data

(60) Provisional application No. 62/955,191, filed on Dec. 30, 2019.

(51) Int. Cl.
*B01L 3/00* (2006.01)

(52) U.S. Cl.
CPC ... *B01L 3/502738* (2013.01); *B01L 3/502715* (2013.01); *B01L 2300/0816* (2013.01);
(Continued)

(58) Field of Classification Search
CPC ......... B01L 3/502738; B01L 3/502715; B01L 2300/0816; B01L 2300/0877; B01L 2400/0487; B01L 2400/0655
See application file for complete search history.

(56) References Cited

U.S. PATENT DOCUMENTS 6,739,576 B2 5/2004 O'Connor et al.
9,046,192 B2 * 6/2015 Mescher ............ F16K 99/0055
(Continued)

FOREIGN PATENT DOCUMENTS

CN 101495236 A 7/2009
CN 102112229 A 6/2011
(Continued)

*Primary Examiner* — Brian J. Sines
(74) *Attorney, Agent, or Firm* — MARSHALL, GERSTEIN & BORUN LLP

(57) ABSTRACT

Actuation systems and methods for use with flow cells. In accordance with an implementation, a method includes moving, using an actuator disposed within a manifold assembly, a membrane portion of a membrane of the manifold assembly away from a valve seat to enable fluidic flow from a reagent fluidic line to a common fluidic line. The membrane portion and the valve seat forming a membrane valve. The reagent fluidic line being fluidically coupled to a reagent reservoir. The common fluidic line being fluidically coupled to a flow cell. The common fluidic line has a common central axis and the reagent fluidic line has a reagent central axis that is non-collinear with the common central axis. The method includes urging the membrane portion against the valve seat to prevent fluidic flow from the reagent fluidic line to the common fluidic line.

31 Claims, 20 Drawing Sheets

(52) U.S. Cl.
CPC .................. *B01L 2300/0877* (2013.01); *B01L 2400/0487* (2013.01); *B01L 2400/0655* (2013.01)

(56) References Cited

U.S. PATENT DOCUMENTS

| | | | |
|---|---|---|---|
| 9,943,847 | B2 * | 4/2018 | Gilbert .............. B01L 3/502738 |
| 10,183,293 | B2 | 1/2019 | Weber |
| 2005/0092662 | A1 | 5/2005 | Gilbert et al. |
| 2006/0092237 | A1 | 5/2006 | Kwon et al. |
| 2007/0263046 | A1 | 11/2007 | Iwasa et al. |
| 2008/0249510 | A1 | 10/2008 | Mescher et al. |
| 2013/0032210 | A1 | 2/2013 | Johnstone et al. |
| 2013/0150779 | A1 * | 6/2013 | Field .................. A61F 9/00781 604/9 |
| 2016/0016169 | A1 | 1/2016 | Ben-Yakar et al. |
| 2017/0016060 | A1 | 1/2017 | Sabounchi et al. |
| 2017/0157611 | A1 | 6/2017 | Weber |
| 2017/0189904 | A1 | 7/2017 | Aravanis et al. |
| 2019/0070606 | A1 | 3/2019 | Li et al. |
| 2019/0099754 | A1 | 4/2019 | Dupouy et al. |
| 2019/0264276 | A1 | 8/2019 | Sabounchi et al. |
| 2019/0283024 | A1 | 9/2019 | Aravanis et al. |
| 2019/0337690 | A1 | 11/2019 | Crivelli et al. |

FOREIGN PATENT DOCUMENTS

| | | | |
|---|---|---|---|
| CN | 108136388 | A | 6/2018 |
| KR | 10-2016-0031778 | A | 3/2016 |
| WO | WO-2016/000998 | A1 | 1/2016 |
| WO | WO-2017/123855 | A1 | 7/2017 |

* cited by examiner

ACTUATION SYSTEMS AND METHODS FOR USE WITH FLOW CELLS

CROSS-REFERENCE TO RELATED APPLICATIONS

This application is a 35 U.S.C. § 371 National Stage of International Patent Application No. PCT/US2020/066089, filed Dec. 18, 2020, which itself claims priority to U.S. Provisional Application No. 62/955,191, filed Dec. 30, 2019, the content of each of which is incorporated by reference herein in their entireties and for all purposes.

BACKGROUND

Fluidic cartridges carrying reagents and a flow cell are sometimes used in connection with fluidic systems. The fluidic cartridge may be fluidically coupled to the flow cell. The fluidic cartridges include fluidic lines through which the reagents flow to the flow cell.

SUMMARY

In accordance with a first implementation, a method comprises or includes moving, using an actuator disposed within a manifold assembly, a membrane portion of a membrane of the manifold assembly away from a valve seat to enable fluidic flow from a reagent fluidic line to a common fluidic line. The membrane portion and the valve seat forming a membrane valve. The reagent fluidic line being fluidically coupled to a reagent reservoir. The common fluidic line being fluidically coupled to a flow cell. The common fluidic line has a common central axis and the reagent fluidic line has a reagent central axis that is non-collinear with the common central axis. The method comprises or includes urging the membrane portion against the valve seat to prevent fluidic flow from the reagent fluidic line to the common fluidic line.

In accordance with a second implementation, a system comprises or includes a valve drive assembly. The system comprises or includes a reagent cartridge comprising or including a common fluidic line and a plurality of reagent fluidic lines. Each of the plurality of reagent fluidic lines being adapted to be coupled to a corresponding reagent reservoir. The system comprises or includes a manifold assembly comprising or including a plurality of membrane valves and a plurality of actuators disposed within the manifold assembly. The manifold assembly selectively fluidically coupling the common fluidic line and a corresponding one of the plurality of reagent fluidic lines responsive to the valve drive assembly actuating a corresponding one of the plurality of actuators. Each of the plurality of membrane valves is formed between the common fluidic line and a corresponding reagent fluidic line. The valve drive assembly is adapted to interface with the actuators and the plurality of membrane valves to selectively control a flow of reagent between each of the plurality of reagent fluidic lines and the common fluidic line.

In accordance with a third implementation, an apparatus comprises or includes a common fluidic line and a plurality of reagent fluidic lines. Each of the plurality of reagent fluidic lines being adapted to be coupled to a corresponding reagent reservoir. The apparatus comprises or includes a manifold assembly comprising or including a plurality of membrane valves and a plurality of actuators disposed within the manifold assembly. The manifold assembly selectively fluidically coupling the common fluidic line, a corresponding one of the plurality of reagent fluidic lines responsive to actuation of a corresponding one of the plurality of actuators. Each of the plurality of membranes valve is formed between the common fluidic line and a corresponding one of the plurality of reagent fluidic lines.

In accordance with a fourth implementation, an apparatus comprises or includes a flow cell assembly comprising or including a plurality of laminate layers that form a flow cell inlet, a flow cell outlet, a flow cell, and a manifold assembly. The manifold assembly comprising or including a common fluidic line; a plurality of reagent fluidic lines, each of the plurality of reagent fluidic lines being adapted to be fluidically coupled to a corresponding reagent reservoir; and a plurality of membrane valves selectively fluidically coupling the common fluidic line and a corresponding one of the plurality of reagent fluidic lines.

In accordance with a fifth implementation, a method comprises or includes moving, using an actuator disposed within a flow cell assembly, a membrane portion of a membrane away from a valve seat to enable fluidic flow from a reagent fluidic line to a common fluidic line. The membrane portion and the valve seat forming a membrane valve. The reagent fluidic line being fluidically coupled to a reagent reservoir. The common fluidic line being fluidically coupled to a flow cell. The common fluidic line has a common central axis and the reagent fluidic line has a reagent central axis that is non-collinear with the common central axis. The method comprises or includes urging the membrane portion against the valve seat to prevent fluidic flow from the reagent fluidic line to the common fluidic line.

In accordance with a sixth implementation, an apparatus comprises or includes a system comprising or including a reagent cartridge receptacle and a valve drive assembly. The apparatus comprises or includes a flow cell assembly. The apparatus comprises or includes a reagent cartridge receivable within the reagent cartridge receptacle. The reagent cartridge comprising or including a common fluidic line and a plurality of reagent fluidic lines. Each reagent fluidic line being adapted to be coupled to a corresponding reagent reservoir. The apparatus comprising or including a manifold assembly comprising or including a plurality of membrane valves and a plurality of actuators disposed within the manifold assembly. The manifold assembly fluidically coupling the common fluidic line and each of the reagent fluidic lines. Each membrane valve is coupled between the common fluidic line and a corresponding reagent fluidic line. The valve drive assembly is adapted to interface with the actuators and the membrane valves to control a flow of reagent between the reagent fluidic lines and the common fluidic line.

In accordance with a seventh implementation, an apparatus comprises or includes a flow cell assembly. The apparatus comprises or includes a reagent cartridge comprising or including a common fluidic line and a plurality of reagent fluidic lines. Each reagent fluidic line being adapted to be coupled to a corresponding reagent reservoir. The apparatus comprising or including a manifold assembly comprising or including a plurality of membrane valves and a plurality of actuators disposed within the manifold assembly. The manifold assembly fluidically coupling the common fluidic line and each of the reagent fluidic lines. Each membrane valve is coupled between the common fluidic line and a corresponding reagent fluidic line.

In accordance with a eighth implementation, an apparatus comprises or includes a flow cell assembly comprising or including a plurality of laminate layers that form a flow cell inlet, a flow cell outlet, a flow cell, and a manifold assembly.

The manifold assembly comprising or including a common fluidic line and a plurality of reagent fluidic lines. Each reagent fluidic line being adapted to be coupled to a corresponding reagent reservoir. The manifold assembly comprises or includes a plurality of membrane valves fluidically coupling the common fluidic line and each of the reagent fluidic lines.

In accordance with a ninth implementation, an apparatus comprises or includes a system comprising or including a reagent cartridge receptacle and a valve drive assembly. The apparatus comprises or includes a flow cell assembly. The apparatus comprises or includes a reagent cartridge receivable within the reagent cartridge receptacle. The apparatus comprising or including a common fluidic line and a plurality of reagent fluidic lines. Each reagent fluidic line being adapted to be coupled to a corresponding reagent reservoir. The reagent cartridge comprising or including a manifold assembly comprising or including a plurality of membrane valves. The manifold assembly fluidically coupling the common fluidic line and each of the reagent fluidic lines. Each membrane valve is coupled between the common fluidic line and a corresponding reagent fluidic line. The valve drive assembly is adapted to interface with the membrane valves to control a flow of reagent between the reagent fluidic lines and the common fluidic line.

In accordance with a tenth implementation, an apparatus comprises or includes a flow cell assembly. The apparatus comprises or includes a reagent cartridge comprising or including a common fluidic line and a plurality of reagent fluidic lines. Each reagent fluidic line being adapted to be coupled to a corresponding reagent reservoir. The apparatus comprising or including a manifold assembly comprising or including a plurality of membrane valves. The manifold assembly fluidically coupling the common fluidic line and each of the reagent fluidic lines. Each membrane valve is coupled between the common fluidic line and a corresponding reagent fluidic line.

In accordance with a eleventh implementation, a method comprises or includes allowing a membrane portion of a membrane to move away from a valve seat to enable fluidic flow from a reagent fluidic line to a common fluidic line. The membrane portion and the valve seat forming a membrane valve. The reagent fluidic line being fluidically coupled to a reagent reservoir. The common fluidic line being fluidically coupled to a flow cell. The common fluidic line has a common central axis and the reagent fluidic line has a reagent central axis that is non-collinear with the common central axis. The method comprises or includes urging the membrane portion against the valve seat to prevent fluidic flow from the reagent fluidic line to the common fluidic line.

In further accordance with the foregoing first, second, third, fourth, fifth, sixth, seventh, eighth, ninth, tenth, and/or eleventh implementations, an apparatus and/or method may further comprise or include any one or more of the following:

In an implementation, further comprising or including allowing a second membrane portion of the membrane to move away from a second valve seat to enable fluidic flow from a second reagent fluidic line to the common fluidic line. The second membrane portion and the second valve seat forming a second membrane valve. The second reagent fluidic line being coupled to a second reagent reservoir. The second reagent fluidic line comprising or having a reagent central axis that is non-collinear with the common central axis. The method comprises or includes urging the second membrane portion against the second valve seat to prevent fluidic flow from the second reagent fluidic line to the common fluidic line.

In another implementation, the actuator comprises or includes a pivot comprising or having a distal end that is adapted to move the membrane away from the valve seat.

In another implementation, the actuator is a cantilever comprising or having a distal end that is adapted to move the membrane away from the valve seat.

In another implementation, further comprising or including pressurizing the reagent reservoir.

In another implementation, the manifold assembly comprises or includes a manifold body defining a portion of the common fluidic line and a portion of the reagent fluidic lines and a membrane coupled to portions of the manifold body. The membrane valves being formed by the membrane and the manifold body.

In another implementation, the manifold body comprises or includes a valve seat disposed between the portions of the manifold body.

In another implementation, the valve seat is formed by a protrusion against which the membrane is adapted to engage.

In another implementation, the protrusion separates the common fluidic line and the corresponding one of the plurality of reagent fluidic lines.

In another implementation, the membrane is moveable relative to the valve seat.

In another implementation, the valve drive assembly is adapted to interface with the membrane and to drive the membrane against the valve seat to close a corresponding one of the plurality of membrane valves.

In another implementation, further comprising or including a shut-off valve to control the flow between at least one of the plurality of reagent fluidic lines and the common fluidic line.

In another implementation, the reagent cartridge comprises or includes the manifold assembly.

In another implementation, the reagent cartridge comprises or includes a plurality of reagent reservoirs each fluidically coupled to the plurality of reagent fluidic lines.

In another implementation, the system comprises or includes a pressure source selectively fluidically coupled to at least one of the plurality of reagent reservoirs.

In another implementation, the common fluidic line comprises or has a common central axis and each of the reagent fluidic lines comprise or have a reagent central axis that is non-collinear with the common central axis.

In another implementation, the valve drive assembly comprises or includes a plurality of plungers.

In another implementation, the valve drive assembly comprises or includes a pressure source adapted to actuate a corresponding one of the plurality of membrane valves.

In another implementation, the valve drive assembly comprises or includes one or more plungers coupled to the membrane via a snap fit connection or a magnetic connection.

In another implementation, the plurality of membrane valves are arranged arcuately about the common fluidic line.

In another implementation, the manifold assembly comprises or includes a manifold body and opposing membranes coupled to the manifold body, the manifold body defining a portion of the common fluidic line, a portion of the plurality of reagent fluidic lines, and a plurality of valve seats that each separate the common fluidic line and a corresponding one of the plurality of reagent fluidic lines.

In another implementation, at least one of the plurality of actuators is a cantilever comprising or having a distal end that is adapted to move one of the opposing membranes away from a corresponding valve seat of one of the plurality of membrane valves.

In another implementation, the plurality of actuators are positioned between the opposing membranes.

In another implementation, further comprising or including a valve drive assembly adapted to interface with each of the plurality of actuators to move a corresponding membrane of a corresponding one of the plurality of membranes away from a corresponding valve seat.

In another implementation, the valve drive assembly is adapted to interface with a corresponding one of the plurality of membrane valves on a first side of the manifold assembly and to interface with a corresponding one of the plurality of actuators on a second side of the manifold assembly.

In another implementation, the manifold assembly comprises or includes a manifold body that defines a receptacle adjacent each of the plurality of actuators. The receptacles adapted to guide the valve drive assembly into engagement with the corresponding one of the plurality of actuators.

In another implementation, further comprising or including an indexer adapted to move the valve drive assembly to interface with different ones of the plurality of actuators.

In another implementation, one of the plurality of actuators comprises or includes a pivot comprising or having a distal end that is adapted to move a corresponding membrane away from a corresponding valve seat.

In another implementation, the manifold assembly is part of a flow cell assembly.

In another implementation, the flow cell assembly comprises or includes a plurality of layers and wherein the manifold assembly is defined by or between one or more of the plurality of layers.

In another implementation, the flow cell assembly comprises or includes a plurality of laminate layers and wherein the manifold assembly is defined by or between one or more of the plurality of layers.

In another implementation, the common fluidic line and the plurality of reagent fluidic lines are defined by or between one or more of the plurality of laminate layers.

In another implementation, one or more of the plurality of laminate layers comprise micro-structures or nano-structures.

In another implementation, the flow cell comprises or includes a pattern defined by one or more of the plurality of laminate layers.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

BRIEF DESCRIPTION OF THE DRAWINGS

FIG. 10 is an isometric partially transparent view of an example implementation of the manifold assembly, the actuators, and the membrane valves of FIG. 1A.

DETAILED DESCRIPTION

Figure 1A:
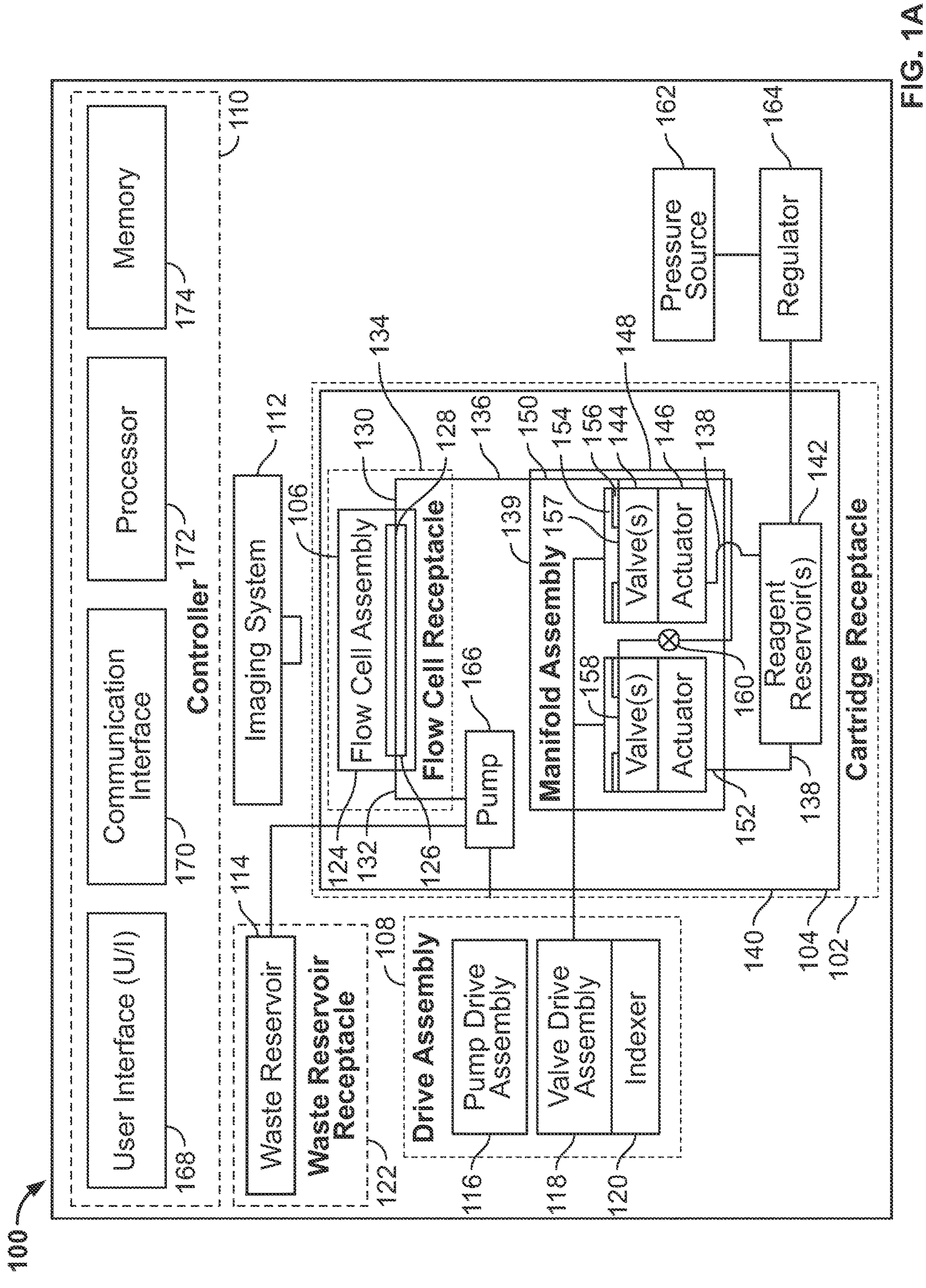
FIG. 1A illustrates a schematic diagram of an implementation of a system in accordance with a first example of the present disclosure.

Although the following text discloses a detailed description of implementations of methods, apparatuses, and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative examples would still fall within the scope of the claims.

The implementations disclosed herein are directed toward reagent cartridges and flow cell cartridges including membrane valves. In an implementation, the membrane valves are part of a manifold assembly and control fluidic flow between reagent fluidic lines and a common fluidic line. Advantageously, the location of the membrane valves may reduce an amount of dead volume within the fluidic network. For example, using the membrane valves as disclosed may reduce an amount of dead volume between the reagent fluidic lines and the common fluidic line. As a result, less consumables, such as reagents, may be used. Using less consumables may allow for the cost of the reagent cartridges to be reduced and/or for the size of the reagent cartridges to be reduced. Moreover, decreasing the dead volume of consumables within the fluidic network may decrease cross-contamination between reagents. In some implementations, the manifold assembly may be part of a flow cell assembly formed by a plurality of laminate layers. Each of the reagent fluidic lines is coupled to the common fluidic line and have axes that are non-collinear with the axis of the common fluidic line. The reagent fluidic lines are coupled to corresponding reagent reservoirs. The reagents reservoirs may be pressurized.

The manifold assembly includes a manifold body defining a portion of the common fluidic line and a portion of the reagent fluidic lines. The manifold assembly also includes a membrane coupled to portions of the manifold body. The membrane valves are formed by the membrane and the manifold body. The manifold body includes a valve seat and the membrane is not coupled to the valve seat. Actuators may be disposed within the manifold assembly and may be arranged to move the membrane away from the valve seat.

To close the membrane valves, a valve drive assembly of a system (such as a sequencing system) interfaces with the membrane to drive the membrane against the corresponding valve seat. To open the membrane valves, the valve drive assembly allows the membrane to move away from the valve seat and to flow fluid between the membrane and the valve seat to the common fluidic line from the corresponding reagent fluidic line. In an implementation, an actuator disposed within the manifold assembly is actuated to move the membrane away from the valve seat.

FIG. 1A illustrates a schematic diagram of an implementation of a system 100 in accordance with a first example of the present disclosure. The system 100 can be used to perform an analysis on one or more samples of interest. The sample may include one or more DNA clusters that have been linearized to form a single stranded DNA (sstDNA). In the implementation shown, the system 100 includes a reagent cartridge receptacle 102 that is adapted to receive a reagent cartridge 104. The reagent cartridge 104 carries a flow cell assembly 106.

In the implementation shown, the system 100 includes, in part, a drive assembly 108, a controller 110, an imaging system 112, and a waste reservoir 114. The drive assembly 108 includes a pump drive assembly 116, a valve drive assembly 118, and an indexer 120. The controller 110 is electrically and/or communicatively coupled to the drive assembly 108 and the imaging system 112 and is adapted to cause the drive assembly 108 and/or the imaging system 112 to perform various functions as disclosed herein. The waste reservoir 114 may be selectively receivable within a waste reservoir receptacle 122 of the system 100. In other implementations, the waste reservoir 114 may be included in the reagent cartridge 104.

The reagent cartridge 104 may carry one or more samples of interest. The drive assembly 108 interfaces with the reagent cartridge 104 to flow one or more reagents (e.g., A, T, G, C nucleotides) that interact with the sample through the reagent cartridge 104 and/or through the flow cell assembly 106.

In an implantation, a reversible terminator is attached to the reagent to allow a single nucleotide to be incorporated by the sstDNA per cycle. In some such implementations, one or more of the nucleotides has a unique fluorescent label that emits a color when excited. The color (or absence thereof) is used to detect the corresponding nucleotide. In the implementation shown, the imaging system 112 is adapted to excite one or more of the identifiable labels (e.g., a fluorescent label) and thereafter obtain image data for the identifiable labels. The labels may be excited by incident light and/or a laser and the image data may include one or more colors emitted by the respective labels in response to the excitation. The image data (e.g., detection data) may be analyzed by the system 100. The imaging system 112 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 108 interfaces with the reagent cartridge 104 to flow another reaction component (e.g., a reagent) through the reagent cartridge 104 that is thereafter received by the waste reservoir 114 and/or otherwise exhausted by the reagent cartridge 104. The reaction component performs a flushing operation that chemically cleaves the fluorescent label and the reversible terminator from the sstDNA. The sstDNA is then ready for another cycle.

The flow cell assembly 106 includes a housing 124 and a flow cell 126. The flow cell 126 includes at least one channel 128, a flow cell inlet 130, and a flow cell outlet 132. The channel 128 may be U-shaped or may be straight and extend across the flow cell 126. Other configurations of the channel 128 may prove suitable. Each of the channels 128 may have a dedicated flow cell inlet 130 and a dedicated flow cell outlet 132. A single flow cell inlet 130 may alternatively be fluidly coupled to more than one channel 128 via, for example, an inlet manifold. A single flow cell outlet 132 may alternatively be coupled to more than one channel via, for example, an outlet manifold. In an implementation, the flow cell assembly 106 may be formed by a plurality of layers such as, for example, laminate layers as further disclosed below (see, for example, FIGS. 20 and 21). In such an implementation, the flow cell 126 and/or the channel 128 may include one or more microstructures or nanostructures. The microstructures may be formed using a nanoimprint lithography pattern or embossing. Other manufacturing techniques may prove suitable. The nanostructures may include wells, pillars, electrodes, gratings, etc.

In the implementation shown, the reagent cartridge 104 includes a flow cell receptacle 134, a common fluidic line 136, a plurality of reagent fluidic lines 138, and a manifold assembly 139. In other implementations, the manifold assembly 139 is part of the flow cell assembly 106 and/or part of the system 100. The reagent cartridge 104 includes a reagent cartridge body 140.

The flow cell receptacle 134 is adapted to receive the flow cell assembly 106. Alternatively, the flow cell assembly 106 can be integrated into the reagent cartridge 104. In such implementations, the flow cell receptacle 134 may not be included or, at least, the flow cell assembly 106 may not be removably receivable within the reagent cartridge 104. In some implementations, the flow cell assembly 106 may be separate from the reagent cartridge 104 and receivable in a flow cell receptacle 134 of the system 100.

Each of the reagent fluidic lines 138 is adapted to be coupled to a corresponding reagent reservoir 142. The reagent reservoirs 142 may contain fluid (e.g., reagent and/or another reaction component). The reagent cartridge body 140 may be formed of solid plastic using injection molding techniques and/or additive manufacturing techniques. In some implementations, the reagent reservoirs 142 are integrally formed with the reagent cartridge body 140. In other implementations, the reagent reservoirs 142 are separately formed and are coupled to the reagent cartridge body 140.

In the implementation shown, the manifold assembly 139 includes a plurality of membrane valves 144 and a plurality of actuators 146 disposed within the manifold assembly 139. In other implementations, one or more of the actuators 146 may be excluded. The manifold assembly 139 fluidically couples the common fluidic line 136 and each of the reagent fluidic lines 138. Each membrane valve 144 is coupled between the common fluidic line 136 and a corresponding reagent fluidic line 138.

In operation, the valve drive assembly 118 is adapted to interface with the actuators 146 and/or the membrane valves 144 to control a flow of reagent between the reagent fluidic lines 138 and the common fluidic line 136.

The manifold assembly 139 includes a manifold body 148. The manifold body 148 may be formed of polypropylene, a cyclic olefin copolymer, a cyclo olefin polymer, and/or other polymers. The manifold body 148 defines a portion 150 of the common fluidic line 136 and a portion 152 of the reagent fluidic lines 138. A membrane 154 is coupled to portions 156 of the manifold body 148. A portion 157 of the membrane 154 is not coupled to the manifold body 148. Thus, the membrane 154 may be locally bonded to the manifold body 148 with the portion 157 above a valve seat 158 of the manifold body 148 not being bonded to the membrane 154 to allow for a fluidic passage to be created. The membrane 154 may be formed of a flat sheet. The membrane 154 may be elastomeric.

In the implementation shown, the membrane valves 144 are formed by the membrane 154 and the manifold body 148. The manifold body 148 includes the valve seat 158 disposed between the portions 156 of the manifold body 148. The valve seat 158 is not coupled to the membrane 154. Thus, the membrane 154 may move away from the valve seat 158 to allow fluid to flow across the corresponding membrane valve 144. When actuated, the actuators 146 may move the membrane 154 away from the valve seat 158 to allow fluid flow through the corresponding valve 144. Using the actuators 146 may be advantageous when fluid is drawn across the valve 144 using, for example, negative pressure (e.g., a syringe pump). In other implementations, the membrane 154 may move away from the valve seat 158 responsive to a positive pressure of reagent such that the actuators 146 may be omitted.

To close the membrane valves 144, the valve drive assembly 118 is adapted to interface with the membrane 154 and to drive the membrane 154 against the valve seat 158. To open the membrane valves 144, the valve drive assembly 118 may allow the membrane 154 to move away from the valve seat 158. In an implementation where the valve drive assembly 118 includes a plurality of plungers, the plungers may selectively move away from the valve seat 158 to allow the membrane 154 to move away from the valve seat 158. In another implementation, the valve drive assembly 118 includes plungers that are coupled to the membrane 154. The coupling between the plungers and the membrane 154 may be a snap fit connection or a magnetic connection (see, for example, FIGS. 5 and 6). Other types of couplings may prove suitable. For example, the valve drive assembly 118 may be mechanically linked to the membrane 154.

The valve drive assembly 118 may be adapted to actuate the membrane valves 144 in different ways using, for example, a force, a pressure, or a vacuum. If a pressure or vacuum is used to actuate the membrane 154, a pressure source may be included. (see, for example, FIG. 8).

In the implementation shown, the manifold assembly 139 includes a shut-off valve 160. The shut-off valve 160 may interface with the valve drive assembly 118 and may be adapted to further control the flow between at least one of the reagent fluidic lines 138 and the common fluidic line 136. For example, the shut-off valve 160 may be actuated to the closed position after processes using reagent from a corresponding reagent reservoir 142 are complete. The shut-off valve 160 may be positioned upstream or downstream of a respective membrane valve 144. Such an approach may further deter cross-contamination from occurring between the different reagents. Because there is a reduced likelihood of cross-contamination, less wash buffer may be used.

The system 100 includes a pressure source 162 that may, in some implementations, be used to pressurize the reagent cartridge 104. The reagent, under pressure via the pressure source 162, may be urged through the manifold assembly 139 and toward the flow cell assembly 106. In another implementation, the pressure source 162 may be carried by the reagent cartridge 104. A regulator 164 is positioned between the pressure source 162 and the manifold assembly 139. The regulator 164 may be adapted to regulate a pressure of the gas provided to the manifold assembly 139. The gas may be air, nitrogen, and/or argon. Other gases may prove suitable. Alternatively, the regulator 164 and/or pressure source 162 may not be included.

Referring now to the drive assembly 108, in the implementation shown, the drive assembly 108 includes the pump drive assembly 116 and the valve drive assembly 118. The pump drive assembly 116 is adapted to interface with one or more pumps 166 to pump fluid through the reagent cartridge 104. The pump 166 may be implemented by a syringe pump, a peristaltic pump, a diaphragm pump, etc. While the pump 166 may be positioned between the flow cell assembly 106 and the waste reservoir 114, in other implementations, the pump 166 may be positioned upstream of the flow cell assembly 106 or omitted entirely.

Referring to the controller 110, in the implementation shown, the controller 110 includes a user interface 168, a communication interface 170, one or more processors 172, and a memory 174 storing instructions executable by the one or more processors 172 to perform various functions including the disclosed implementation. The user interface 168, the communication interface 170, and the memory 174 are electrically and/or communicatively coupled to the one or more processors 172.

In an implementation, the user interface 168 is adapted to receive input from a user and to provide information to the user associated with the operation of the system 100 and/or an analysis taking place. The user interface 168 may include a touch screen, a display, a key board, a speaker(s), a mouse, a track ball, and/or a voice recognition system. The touch screen and/or the display may display a graphical user interface (GUI).

In an implementation, the communication interface 170 is adapted to enable communication between the system 100 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the system 100. Some of the communications provided to the system 100 may be associated with a fluidics analysis operation, patient records, and/or a protocol(s) to be executed by the system 100.

The one or more processors 172 and/or the system 100 may include one or more of a processor-based system(s) or a microprocessor-based system(s). In some implementations, the one or more processors 172 and/or the system 100 includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The memory 174 can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

Figure 1B:
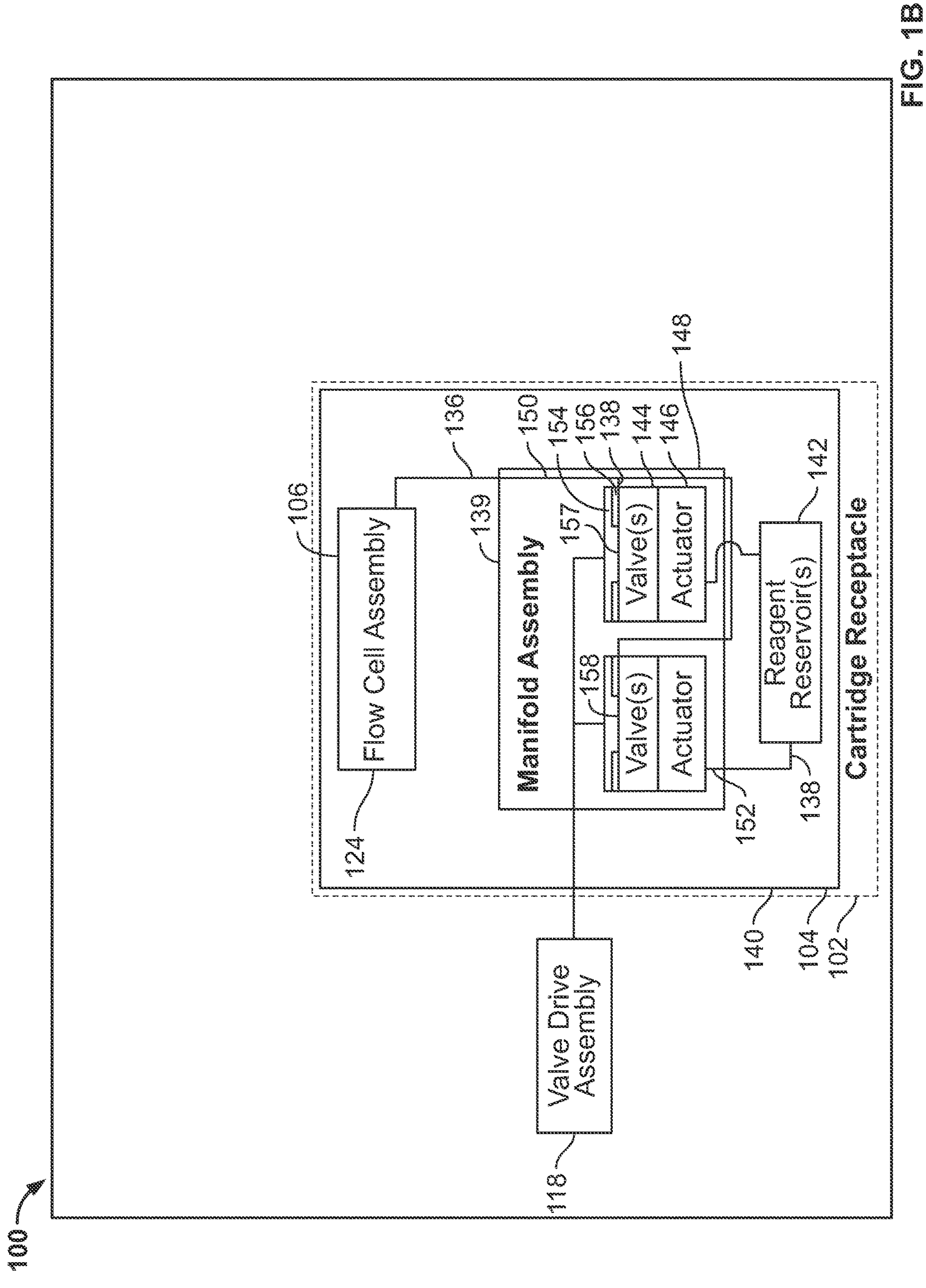
FIG. 1B illustrates a schematic diagram of another example implementation of the system of FIG. 1A.
Figure 1C:
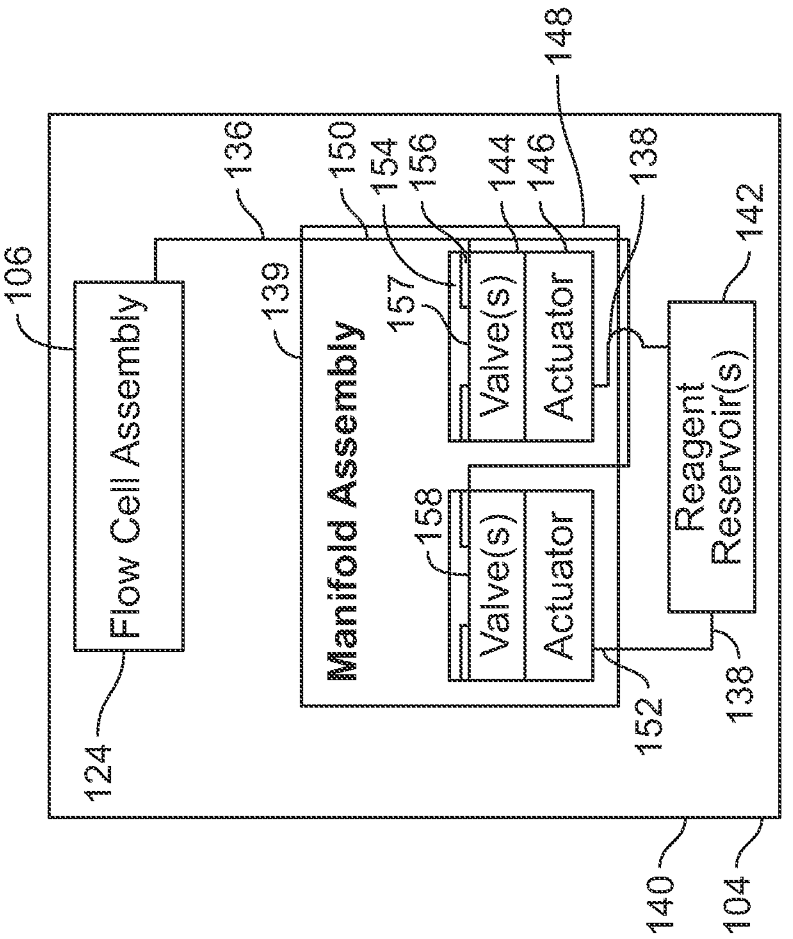

FIG. 1B illustrates a schematic diagram of another example implementation of the system 100 of FIG. 1A. In the implementation shown in FIG. 1B, the system 100 includes the reagent receptacle 102 and the valve drive assembly 118. The reagent cartridge 104 is receivable within the reagent cartridge receptacle 102. The reagent cartridge 104 includes the common fluidic line 136 and the reagent fluidic lines 138. Each of the reagent fluidic lines 138 is adapted to be coupled to a corresponding reagent reservoir 142. The flow cell assembly 106 is included.

In the implementation shown, the manifold assembly 139 is included. The manifold assembly 139 may be part of the reagent cartridge 104 and/or the flow cell assembly 106. The membrane valves 144 and the actuators 146 are disposed within the manifold assembly 139. The manifold assembly 139 fluidically couples the common fluidic line 136 and each of the reagent fluidic lines 138. Each membrane valve 144 is coupled between the common fluidic line 136 and a corresponding reagent fluidic line 138.

To control a flow of reagent between the reagent fluidic lines 138 and the common fluidic line 136, the valve drive assembly 118 is adapted to interface with the actuators 146 and the membrane valves 144.

Figure 10:
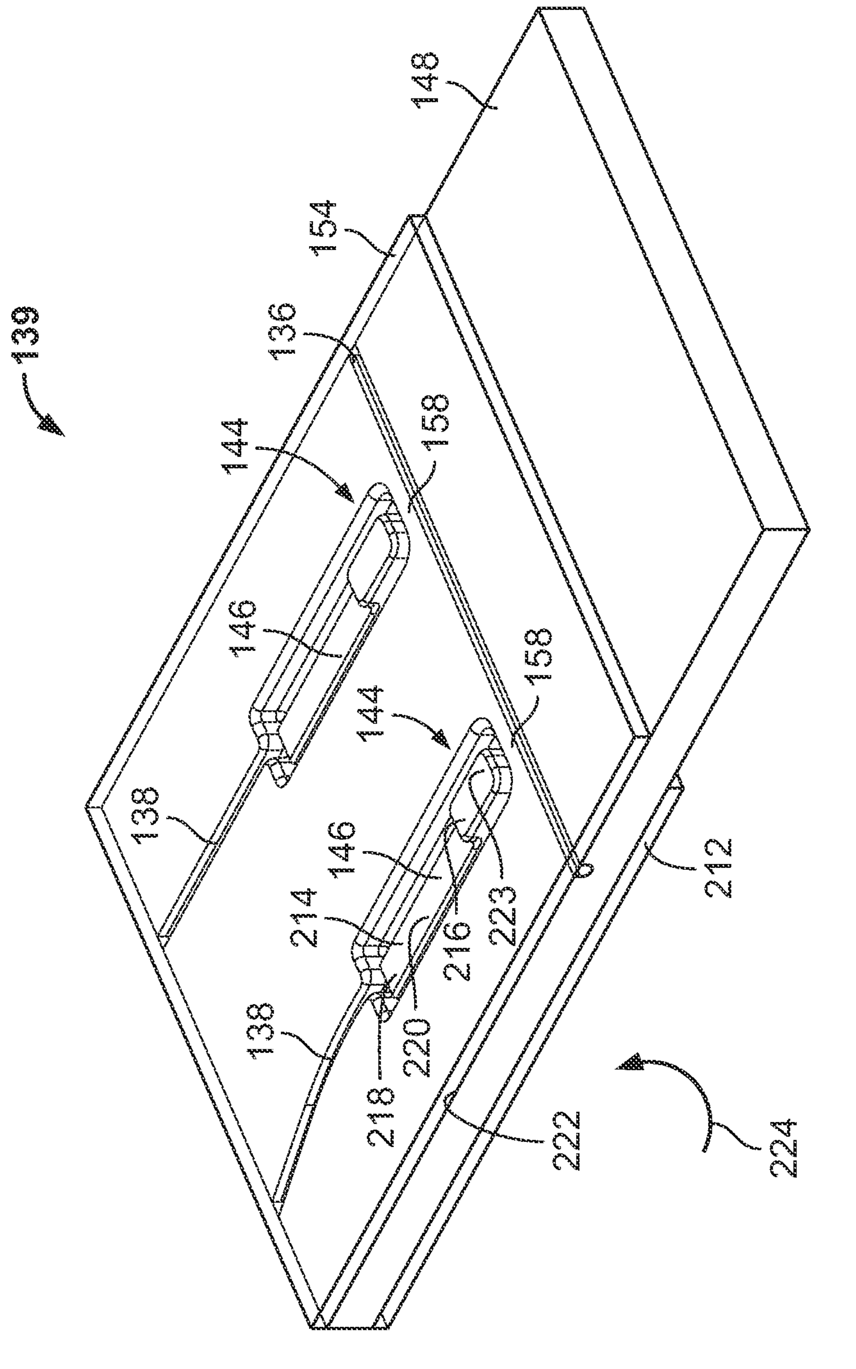
FIG. 10 illustrates a schematic diagram of another example implementation of the flow cell assembly, the reagent cartridge, and the manifold assembly of the system of FIG. 1A.

FIG. 10 illustrates a schematic diagram of another example implementation of the flow cell assembly 106, the reagent cartridge 104, and the manifold assembly 139 of the system 100 of FIG. 1A. In the implementation shown, the reagent cartridge 104 includes the common fluidic line 136 and the reagent fluidic lines 138. Each reagent fluidic line 138 is adapted to be coupled to a corresponding reagent reservoir 142. The flow cell assembly 106 is included.

In the implementation shown, the manifold assembly 139 is included. The membrane valves 144 and the actuators 146 are disposed within the manifold assembly 139. The manifold assembly 139 fluidically couples the common fluidic line 136 and each of the reagent fluidic lines 138. Each membrane valve 144 is coupled between the common fluidic line 136 and a corresponding reagent fluidic line 138.

Figure 2:
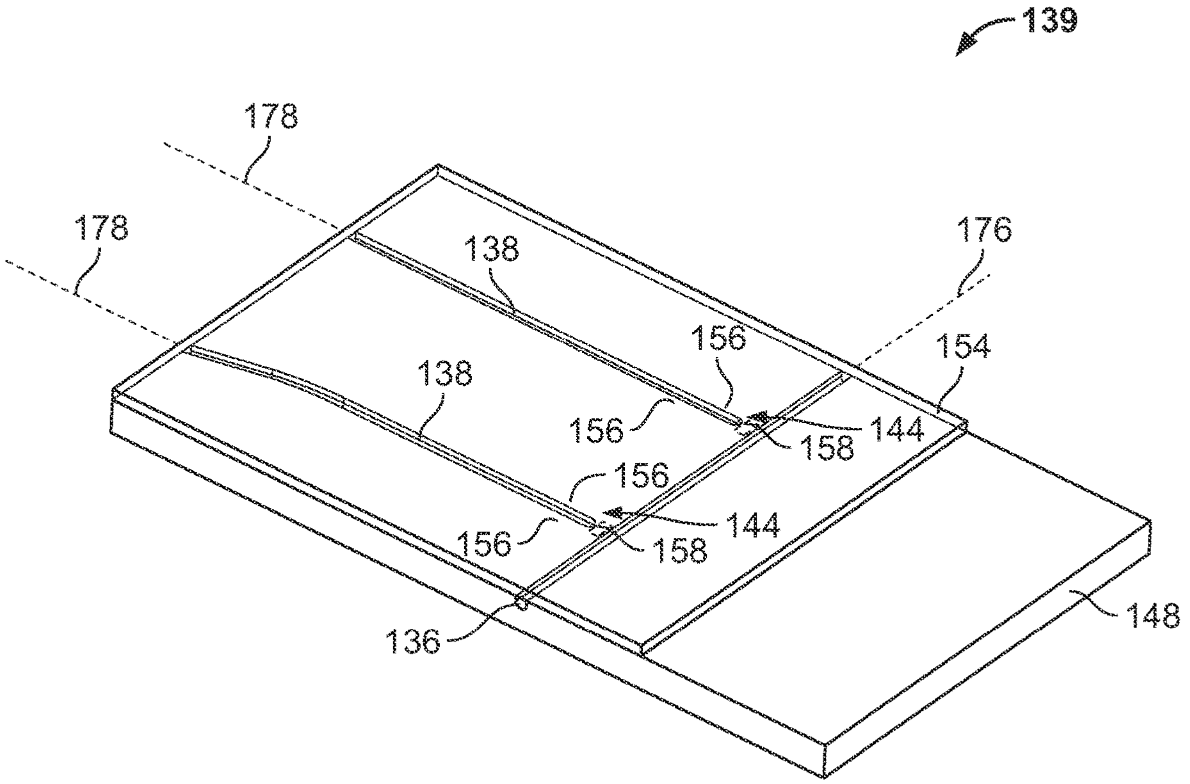
FIG. 2 is an isometric partially transparent view of an example implementation of the manifold assembly and the membrane valves of FIG. 1A.

FIG. 2 is an isometric partially transparent view of an example implementation of the manifold assembly 139 that may be implemented as the membrane valves 144 of FIGS. 1A-10. The manifold assembly 139 includes the manifold body 148, two of the reagent fluidic lines 138, and the common fluidic line 136. The manifold assembly 139 of FIG. 2 does not include the actuators 146. In the implementation shown, the common fluidic line 136 has a common central axis 176 and the reagent fluidic lines 138 have reagent central axes 178. The common central axis 176 is non-collinear with the reagent central axes 178. While the common central axis 176 and the reagent central axes 178 are shown disposed approximately 90° from one another, the common central axis 176 and the reagent central axes 178 may be disposed in any other orientation relative to one another, such as disposed at a 60° angle, a 45° angle, a 30° angle, a 15° angle, or any other angle between 90° angle, inclusive, and 0.1° angle, inclusive. Moreover, one of the reagent central axes 178 may have a first orientation relative to the common central axis 176 and the other one of the reagent central axes 178 may have a second, different orientation relative to the common central axis 176.

The membrane 154 of the manifold assembly 139 of FIG. 2 is coupled to portions 156 of the manifold body 148 on either side of the reagent fluidic lines 138. The membrane 154 may be coupled to the manifold body 148 via laser welding, laser bonding, pressure-sensitive adhesive (PSA), or thermal fusion. However, the membrane 154 and the manifold body 148 may be coupled in any suitable way.

Figure 3:
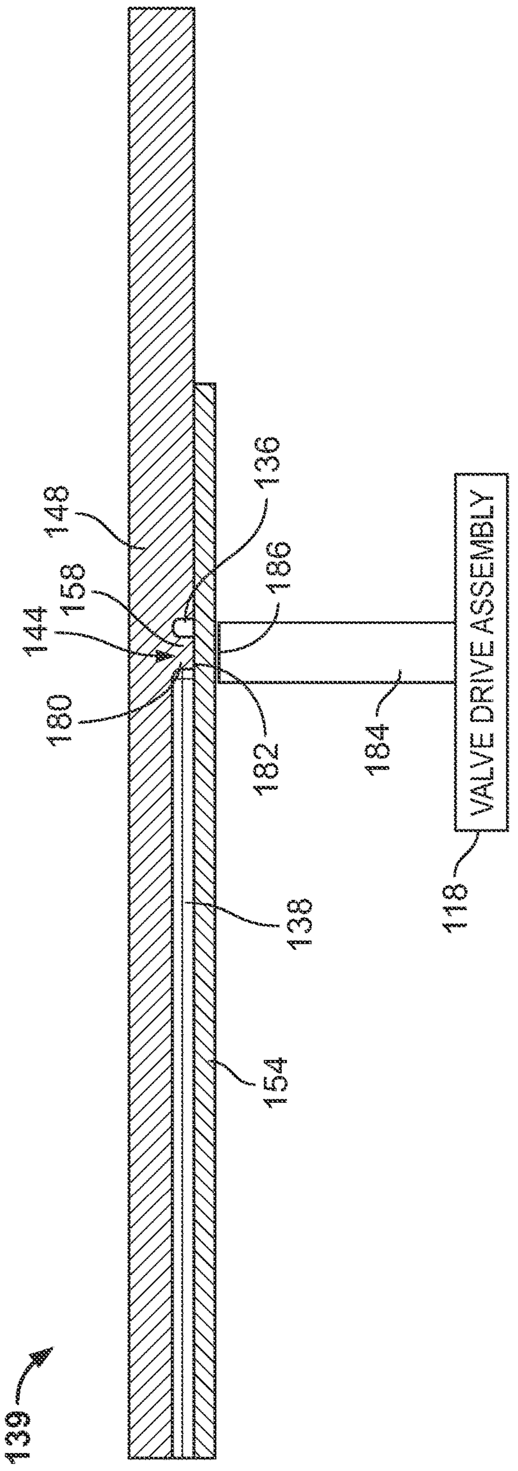
FIG. 3 is a cross-sectional view the manifold assembly of FIG. 2 and an example implementation of the valve drive assembly of FIG. 1A with the membrane valve in the closed position.

FIG. 3 is a cross-sectional view the manifold assembly 139 of FIG. 2 and an example implementation of the valve drive assembly 118 of FIG. 1A with the membrane valve 144 in the closed position. In the closed position, the membrane valve 144 does not protrude and is thus flat relative to the membrane 154 adjacent and/or surrounding the membrane valve 144.

In the implementation shown, the valve seat 158 is formed by a protrusion 180 having a flat surface 182. The protrusion 180 separates the reagent fluidic line 138 and the common fluidic line 136. The membrane 154 is adapted to flushly engage against the flat surface 182. It should be understood that the protrusion 180 does not actually protrude from the manifold body 148, but simply protrudes relative to the reagent fluidic line 138 and the common fluidic line 136 because the reagent fluidic line 138 and the common fluidic line 136 are recessed and/or formed in the manifold body 148. In some implementations, the protrusion 180 can include one or more surface features, such as ridges or dimples instead of being a flat surface.

The valve drive assembly 118 of FIG. 3 includes a valve plunger 184. The valve plunger 184 has a flat surface 186. The valve plunger 184 is actuatable between an extended position shown in FIG. 3 and a retracted position shown in FIG. 4. In FIG. 3, the valve plunger 184 is in the extended position engaging the membrane 154 and driving the membrane 154 against the protrusion 180. The engagement between the membrane 154 and the protrusion 180 substantially prevents fluid flow from the reagent fluidic line 138 and the common fluidic line 136.

Figure 4:
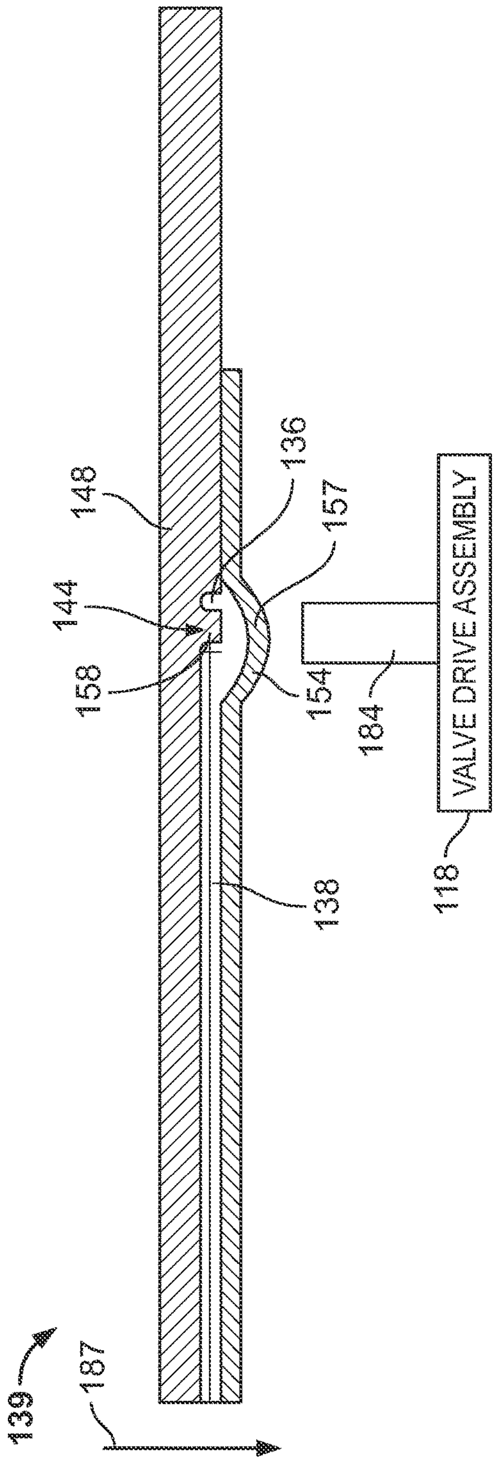
FIG. 4 is a cross-sectional view the manifold assembly and the valve drive assembly of FIG. 3 with the membrane valve in the open position.

FIG. 4 is a cross-sectional view the manifold assembly 139 and the valve drive assembly 118 of FIG. 3 with the membrane valve 144 in the open position. In the implementation shown, the valve plunger 184 is in the retracted position. Thus, the pressure of the reagent within the reagent fluidic line 138 urges the membrane 154 away from the valve seat 158 and in a direction generally indicated by arrow 187 and allows the reagent to flow from the reagent fluidic line 138 to the common fluidic line 136.

Figure 5:
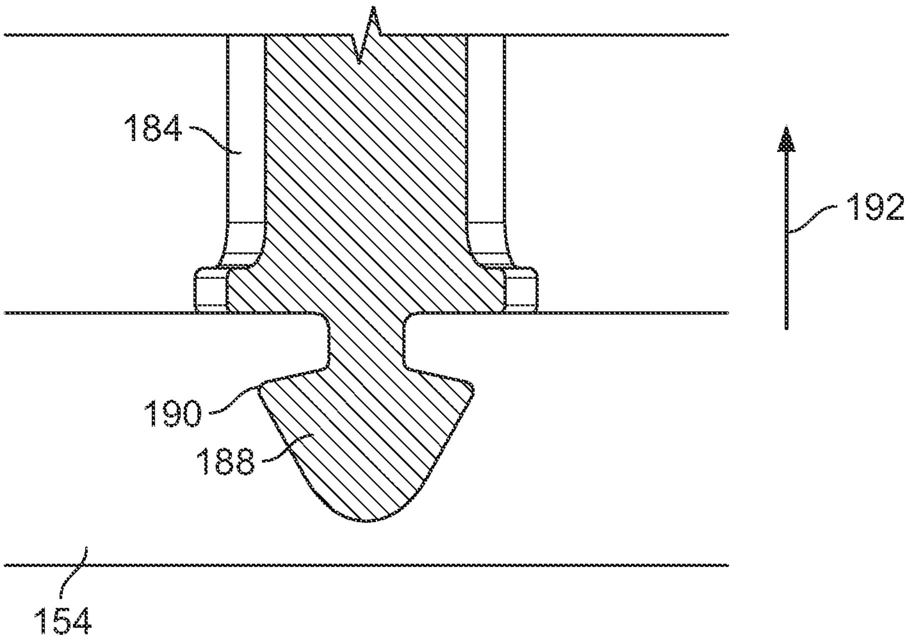
FIG. 5 is a cross-sectional expanded view of an alternative implementation of the membrane and the valve plunger.

FIG. 5 is a cross-sectional expanded view of an alternative implementation of the membrane 154 and the valve plunger 184. In the implementation shown, the valve plunger 184 is coupled to the membrane 154. The valve plunger 184 includes a male portion 188 and the membrane 154 includes a female portion 190. The female portion 190 is defined by an arrow shaped blind bore. The cross-section of the male portion 188 corresponds to the cross-section of the female portion 190.

As shown, the male portion 188 is received by the female portion 190. A snap fit connection is formed between the valve plunger 184 and the membrane 154. Thus, when the valve plunger 184 is moved in a direction generally indicated by arrow 192, the coupling between the valve plunger 184 and the membrane 154 physically moves the membrane 154 in generally the same direction. Thus, in some implementations, the reagent may not be pressurized and the valve plunger 184 can pull the membrane 154 away from the protrusion 180 such that a pump can push and/or pull reagent into the common line 136.

Figure 6:
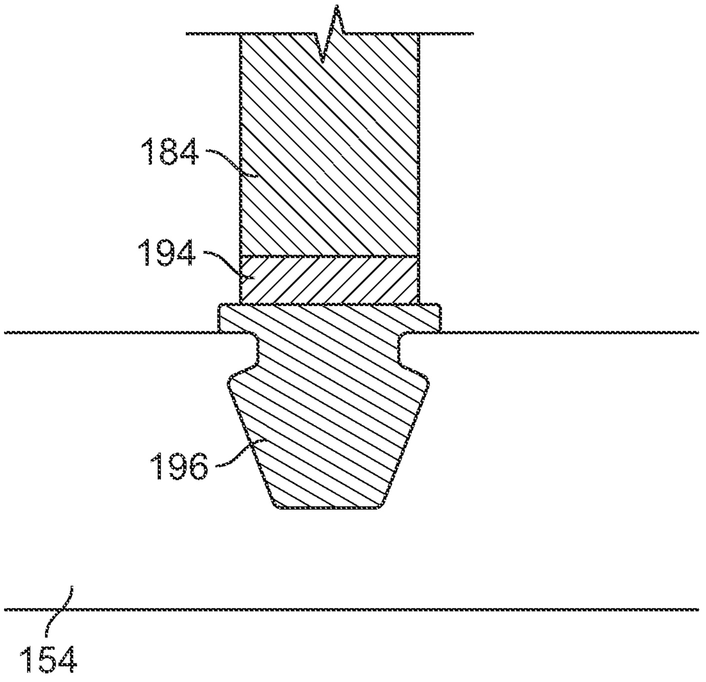
FIG. 6 is a cross-sectional expanded view of an alternative implementation of the membrane and the valve plunger.

FIG. 6 is a cross-sectional expanded view of an alternative implementation of the membrane 154 and the valve plunger 184. In the implementation shown, the valve plunger 184 is coupled to the membrane 154. The valve plunger 184 includes a first magnet 194 and the male portion 188 includes a second magnet 196. The first magnet 194 is attracted to the second magnet 196 such that moving the valve plunger 184 correspondingly moves the membrane 154. As an alternative, one of the first magnet 194 or the second magnet 196 can be a magnet and the other can include a material (a ferromagnetic material) that is attracted to the magnet. In some implementations, the second magnet 196 can be embedded and/or impregnated in the membrane 154.

Figure 7:
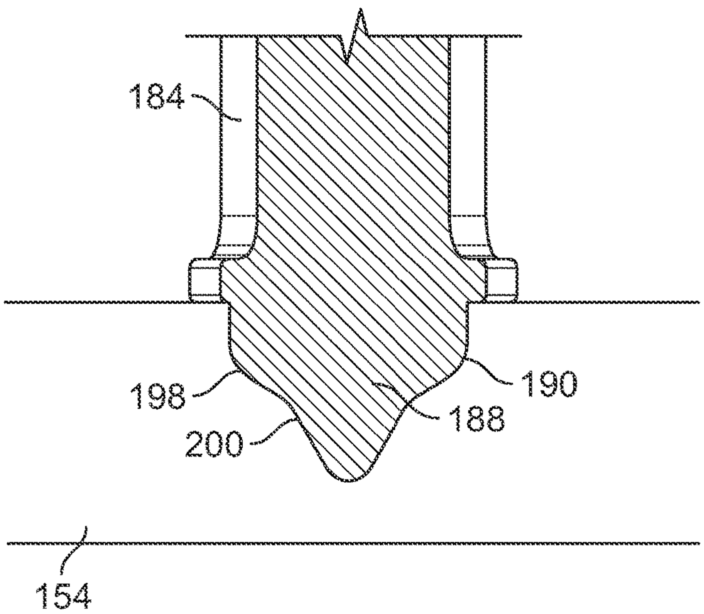
FIG. 7 is a cross-sectional expanded view of an alternative implementation of the membrane and the valve plunger.

FIG. 7 is a cross-sectional expanded view of an alternative implementation of the membrane 154 and the valve plunger 184. In the implementation shown, the valve plunger 184 is coupled to the membrane 154. The valve plunger 184 includes the male portion 188 and the membrane 154 includes the female portion 190. In contrast to the implementation of FIG. 5, a snap fit connection is not formed when the male portion 188 is received by the female portion 190. The female portion 190 includes inwardly tapering sides 198 that correspond to inwardly tapering sides 200 of the male portion 188. The inwardly tapering sides 198, 200 meet at corresponding rounded ends.

Figure 8:
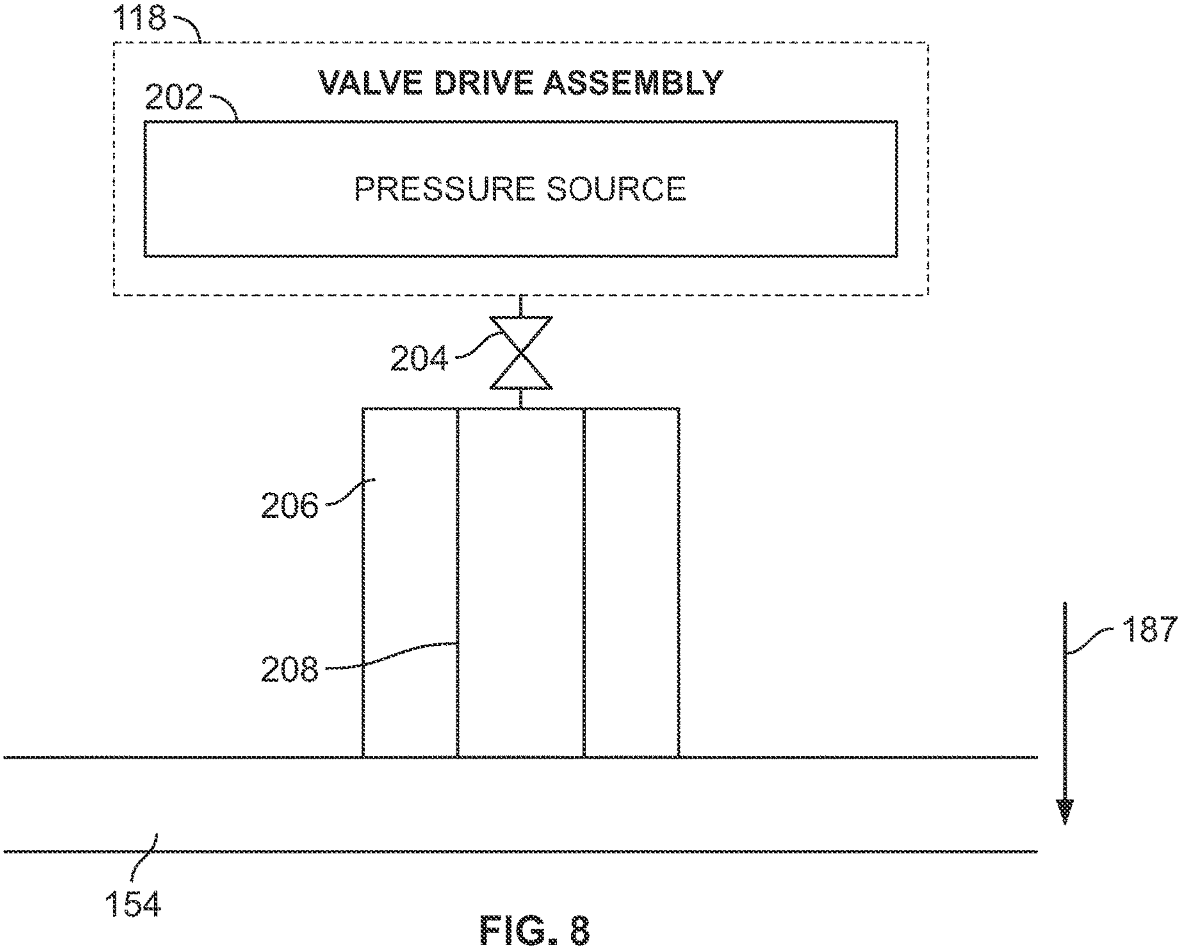
FIG. 8 is a cross-sectional view of the membrane and an alternative implementation of the valve drive assembly.

FIG. 8 is a cross-sectional view of the membrane 154 and an alternative implementation of the valve drive assembly 118. In the implementation shown, the valve drive assembly 118 includes a pressure source 202, a valve 204, and a cylinder 206 having a bore 208. In operation, the pressure source 202 may be adapted to create a positive pressure within the bore 208 that urges the membrane 154 in the direction generally represented by arrow 187. The pressure source 202 may also be adapted to create a negative pressure within the bore 208 that urges the membrane 154 in a direction generally opposite that represented by arrow 187.

Figure 9:
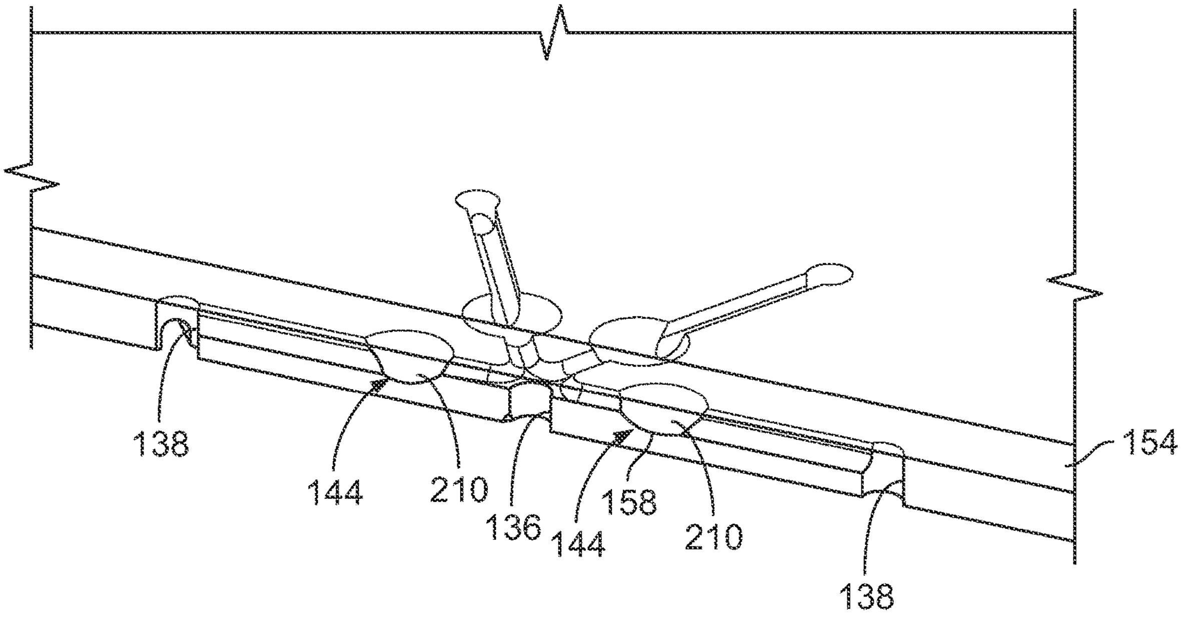
FIG. 9 is an isometric cross-sectional view of another example implementation of the membrane valves of FIG. 1A.

FIG. 9 is an isometric cross-sectional view of another example implementation of the membrane valves 144 of FIG. 1A. In the implementation shown, the membrane valves 144 are arranged circumferentially or semi-circumferentially about the common fluidic line 136. The membrane valves 144 are positioned about 45° relative to one another. However, the membrane valves 144 may be differently positioned. The valve seats 158 are formed as receptacles 210. Thus, when the membrane 154 is received within the receptacle 210, fluid flow is prevented from the corresponding reagent fluidic line 138 to the common fluidic line 136. When the membrane 154 is spaced from the receptacle 210, as shown, fluid may flow from the corresponding reagent fluidic line 138 to the common fluidic line 136.

FIG. 10 is an isometric partially transparent view of an example implementation of the manifold assembly 139, the actuators 146, and the membrane valves 144 of FIG. 1A. The manifold assembly 139 includes the manifold body 148 and opposing membranes 154, 212 coupled to the manifold body 148. The membranes 154, 212 may be coupled to the manifold body 148 in any suitable way. In the implementation shown, the actuators 146 are captured between the opposing membranes 154, 212. The opposing membranes 154, 212 may form a portion of the reagent fluidic line 138.

In the implementation shown, the actuators 146 are cantilevers 214. The cantilevers 214 have a distal end 216 and a proximal end 218. The cantilevers 214 are elongate and may include a portion 220 that is recessed relative to a face 222 of the manifold body 148. The distal end 216 includes a projection 223. The proximal end 218 is pivotably coupled to the manifold body 148. In some implementations, the proximal end 218 is a living hinge. The actuators 146 may be actuatable to move the distal ends 216 in a direction generally indicated by arrow 224 between an extended position and a retracted position, as shown. Thus, the distal ends 216 may be adapted to move the membrane 136 away from the corresponding valve seat 158, such as responsive to a valve plunger 184 engaging with the distal end 216 through the membrane 212.

Figure 11:
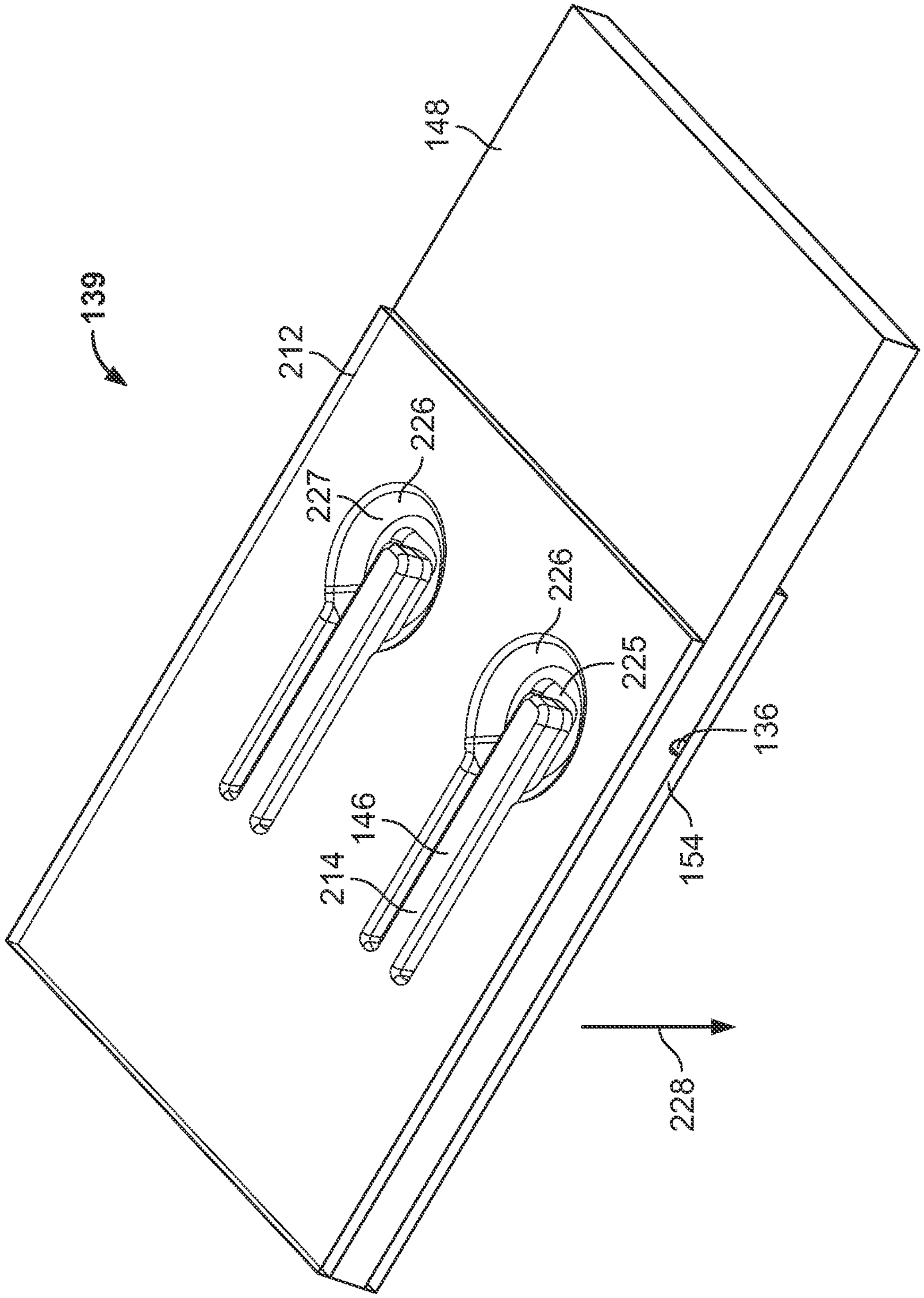
FIG. 11 is another isometric partially transparent view of the example implementation of the manifold assembly of FIG. 10.

FIG. 11 is another isometric partially transparent view of the example implementation of the manifold assembly 139 of FIG. 10. FIG. 11 may show the backside of the manifold assembly 139. In the implementation shown, the manifold body 148 defines a receptacle 226 adjacent to each of the actuators 146. The receptacles 226 are adapted to enable the valve drive assembly 118 to actuate the corresponding actuator 146. As an example, the valve drive assembly 118 may urge the actuator 146 to move relative to an opening 225 between the manifold body 148 and the actuator 146 and in a direction generally indicated by arrow 228 until, for example, the valve drive assembly 118 seats against a surface 227 defining the receptacle 226.

Figure 12:
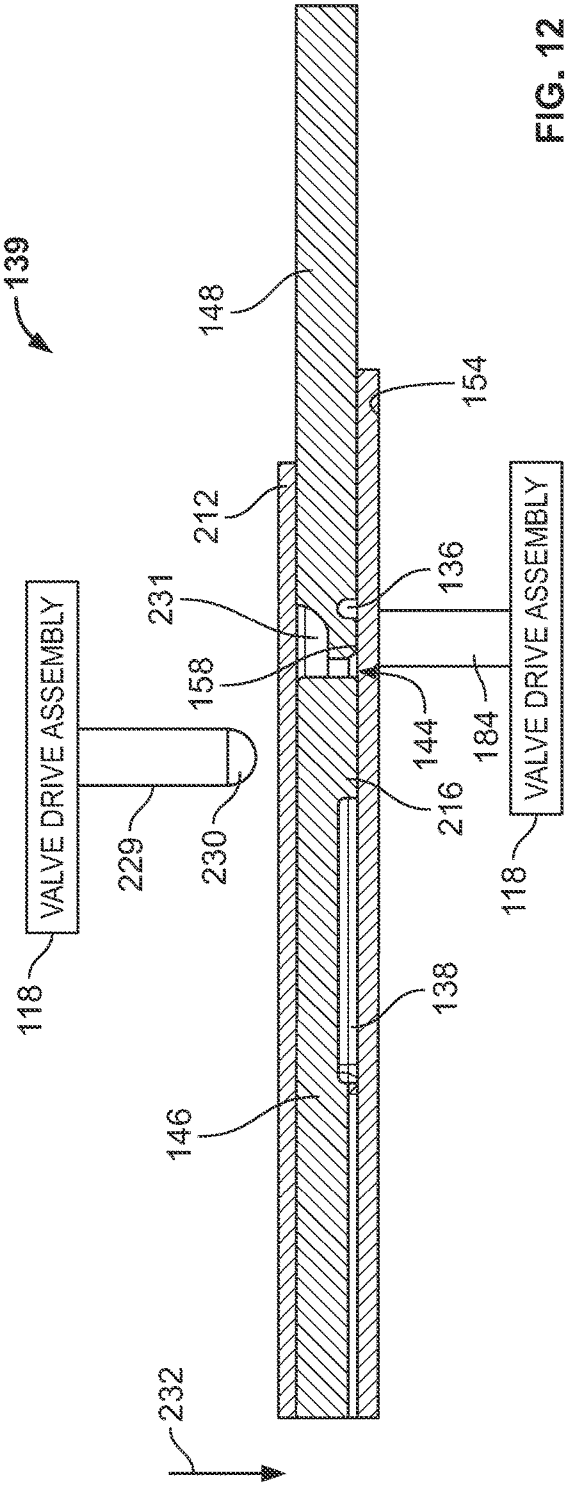
FIG. 12 is a cross-sectional view of the manifold assembly of FIGS. 10 and 11 and another example implementation of the valve drive assembly of FIG. 1A with the membrane valve in the closed position.

FIG. 12 is a cross-sectional view of the manifold assembly 139 of FIGS. 10 and 11 and another example implementation of the valve drive assembly 118 of FIG. 1A with the membrane valve 144 in the closed position. In the implementation shown, the valve drive assembly 118 includes portions on both sides of the manifold assembly 139. Thus, the valve drive assembly 118 is adapted to interface with the membrane valve 144 on a first side of the manifold assembly 139 and to interface with the actuator 146 on a second side of the manifold assembly 139.

The valve drive assembly 118 positioned on the bottom of the manifold assembly 139 relative to the orientation shown in FIG. 12 is adapted to actuate the membrane valve 144. The membrane valve 144 is shown in the closed position with the valve plunger 184 in the extended position urging the membrane 154 against the valve seat 158.

The valve drive assembly 118 positioned on the top of the manifold assembly 139 relative to the orientation shown in FIG. 12 is adapted to actuate the actuator 146. The actuator 146 is shown in the retracted or non-extended position. In the implementation shown, an actuator plunger 229 of the valve drive assembly 118 includes a rounded end 230. However, the end of the plunger 229 may have any other contour. For example, the end of the plunger 229 may be flat. The rounded end 230 and the associated valve drive assembly 118 is adapted to actuate the actuator 146. The rounded end 230 may be adapted to deter the membrane 212 from being damaged.

The manifold body 148 includes a cutout 231 adjacent the distal end 216 of the actuator 146. The cutout 231 is formed by a concave surface. The cutout 231 may be adapted to allow the membrane 212 to be urged, via the valve drive assembly 118, in a direction generally indicated by arrow 232 without putting stress on the membrane 212 in a manner that may damage the membrane 212.

Figure 13:
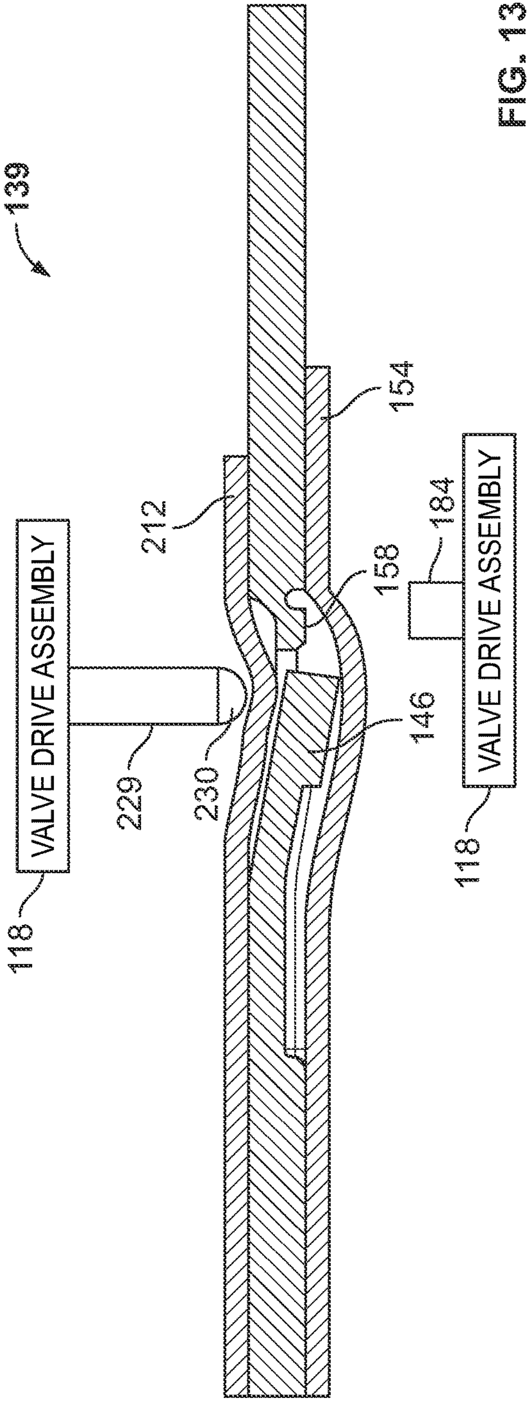
FIG. 13 is a cross-sectional view of the manifold assembly and the valve drive assembly of FIG. 12 with the actuator in the extended position and the membrane valve in the open position.

FIG. 13 is a cross-sectional view of the manifold assembly 139 and the valve drive assembly 118 of FIG. 12 with the actuator 146 in the extended position and the membrane valve 144 in the open position. In the implementation shown, the actuator plunger 229 is in the extended position engaging the membrane 212 and urging the actuator 146 to move the opposing membrane 154 away from the valve seat 158. Using the actuator 146 to move the membrane 154 may be advantageous when the pump 166 pumps/draws the reagent across the valve seat 158 instead of, for example, the reagent reservoir 142 being pressurized. The valve plunger 184 is shown in the retracted position.

Figure 14:
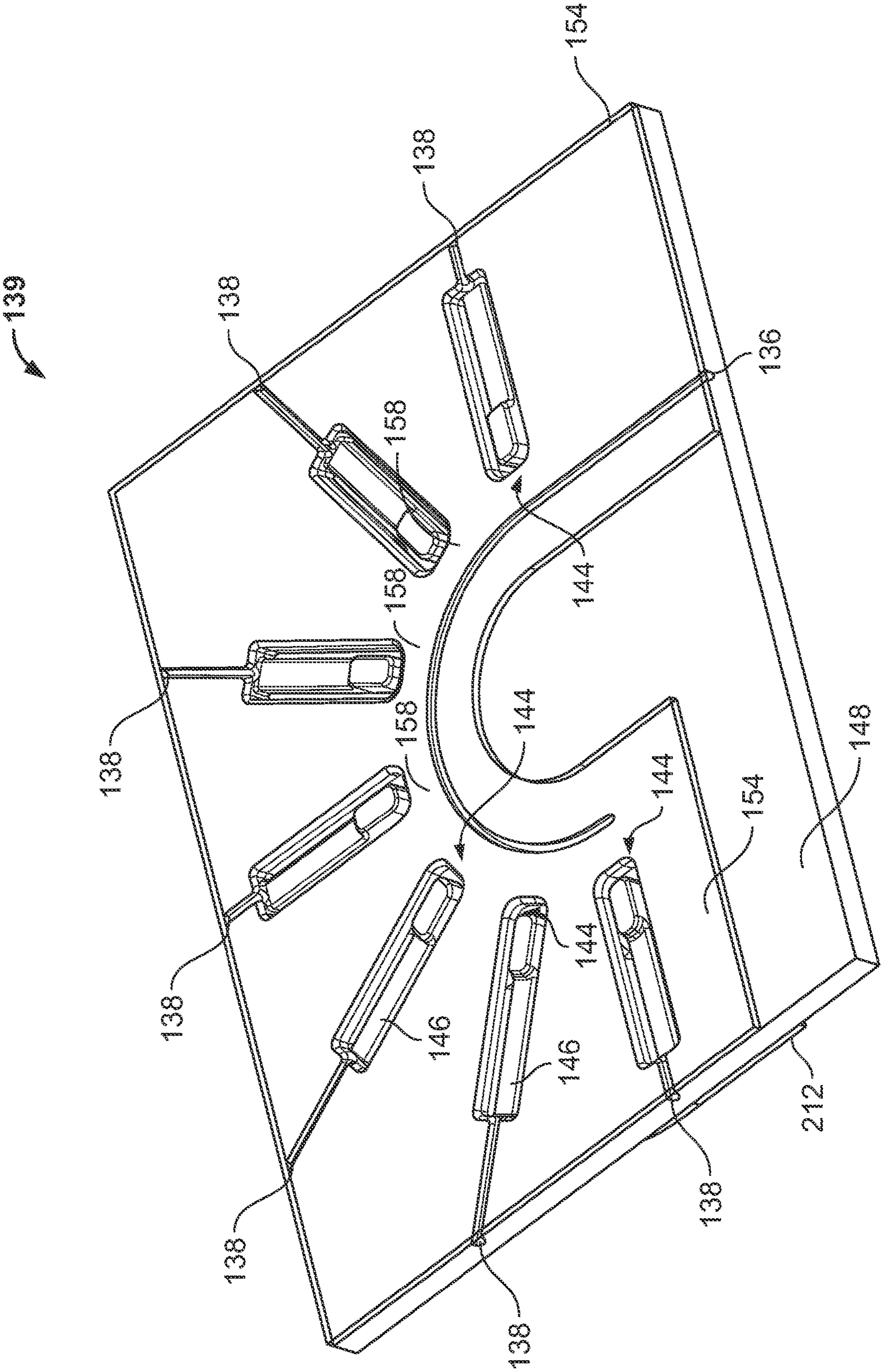
FIG. 14 is an isometric view of another example implementation of the membrane valves and corresponding actuators of FIG. 1A.

FIG. 14 is an isometric view of another example implementation of the membrane valves 144 and corresponding actuators 146 of FIG. 1A. In the implementation shown, the membrane valves 144 and the actuators 146 are arranged about the common fluidic line 136. The common fluidic line 136 is arc-shaped and the membrane valves 144 and the actuators 146 are arranged about the arc. Each of the reagent fluidic lines 138 may be associated with a different reagent. Thus, actuating one or more of the membrane valves 144 and the associated actuator 146 may selectively flow the corresponding reagent from the reagent fluidic line 138 to the common fluidic line 136.

Figure 15:
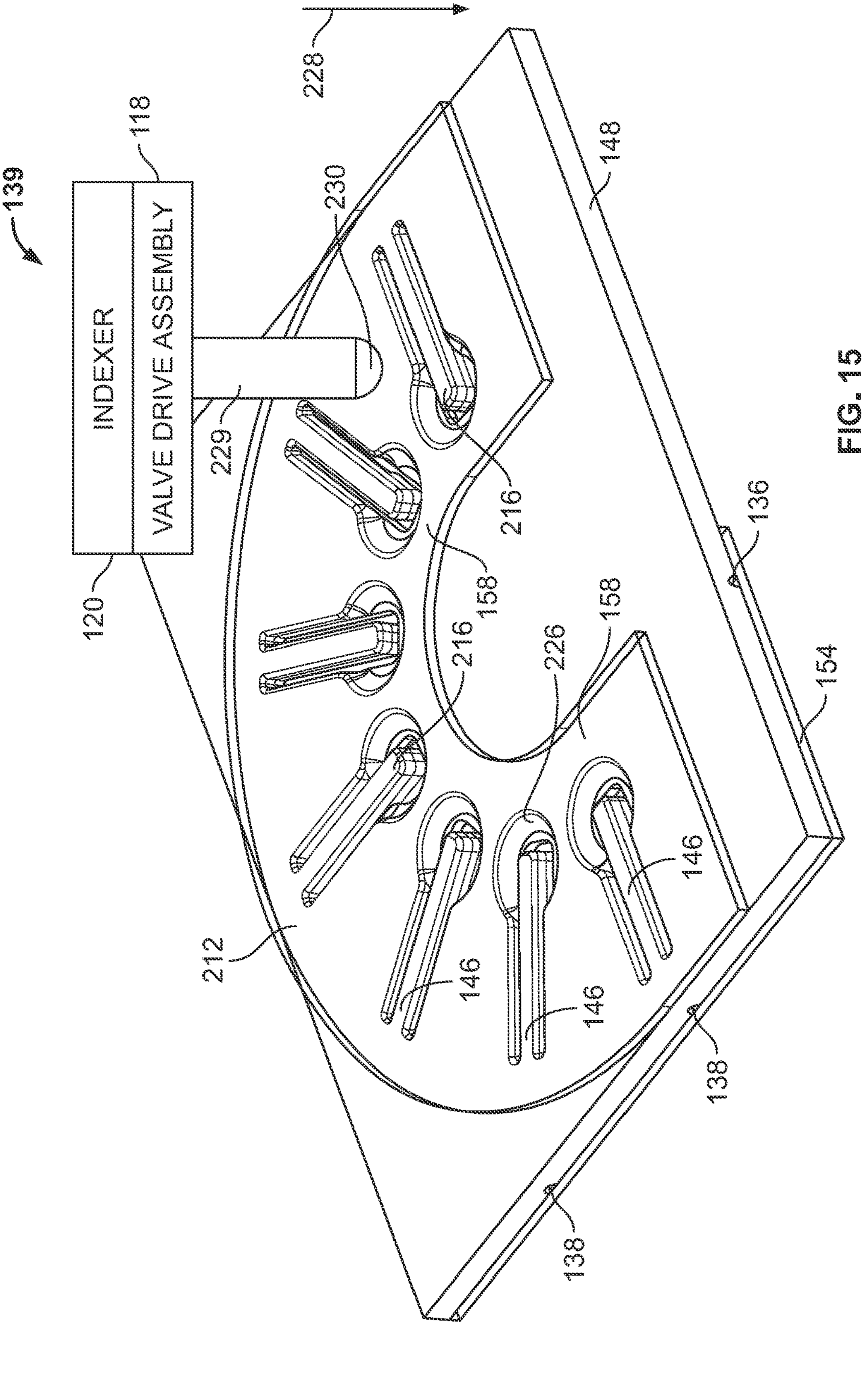
FIG. 15 is another isometric partially transparent view of the example implementation of the manifold assembly of FIG. 14 and including an example implementation of the valve drive assembly and an example implementation of the indexer of FIG. 1A.

FIG. 15 is another isometric partially transparent view of the example implementation of the manifold assembly 139 of FIG. 14 and including an example implementation of the valve drive assembly 118 and an example implementation of the indexer 120. FIG. 15 may show the backside of the manifold assembly 139. The indexer 120 is adapted to move the valve drive assembly 118 to interface with different ones of the actuators 146. For example, the indexer 120 may include a carousel that moves the actuator plunger 229 into alignment with a corresponding actuator 146. Once aligned, the valve drive assembly 118 may move the actuator plunger 229 toward and into engagement with the membrane 212 and further in a direction generally indicated by arrow 228. The actuated actuator 146 may move the opposing membrane 154 away from the associated valve seat 158 (see, FIG. 13) to allow fluid flow between the reagent fluidic line 138 and the common fluidic line 136. While one indexer 120 is shown coupled to the valve drive assembly 118 having a single plunger 229, more than one indexer 120 may be included, more than one valve drive assembly 118 may be included, and/or more than one plunger 229 may be included.

Figure 16:
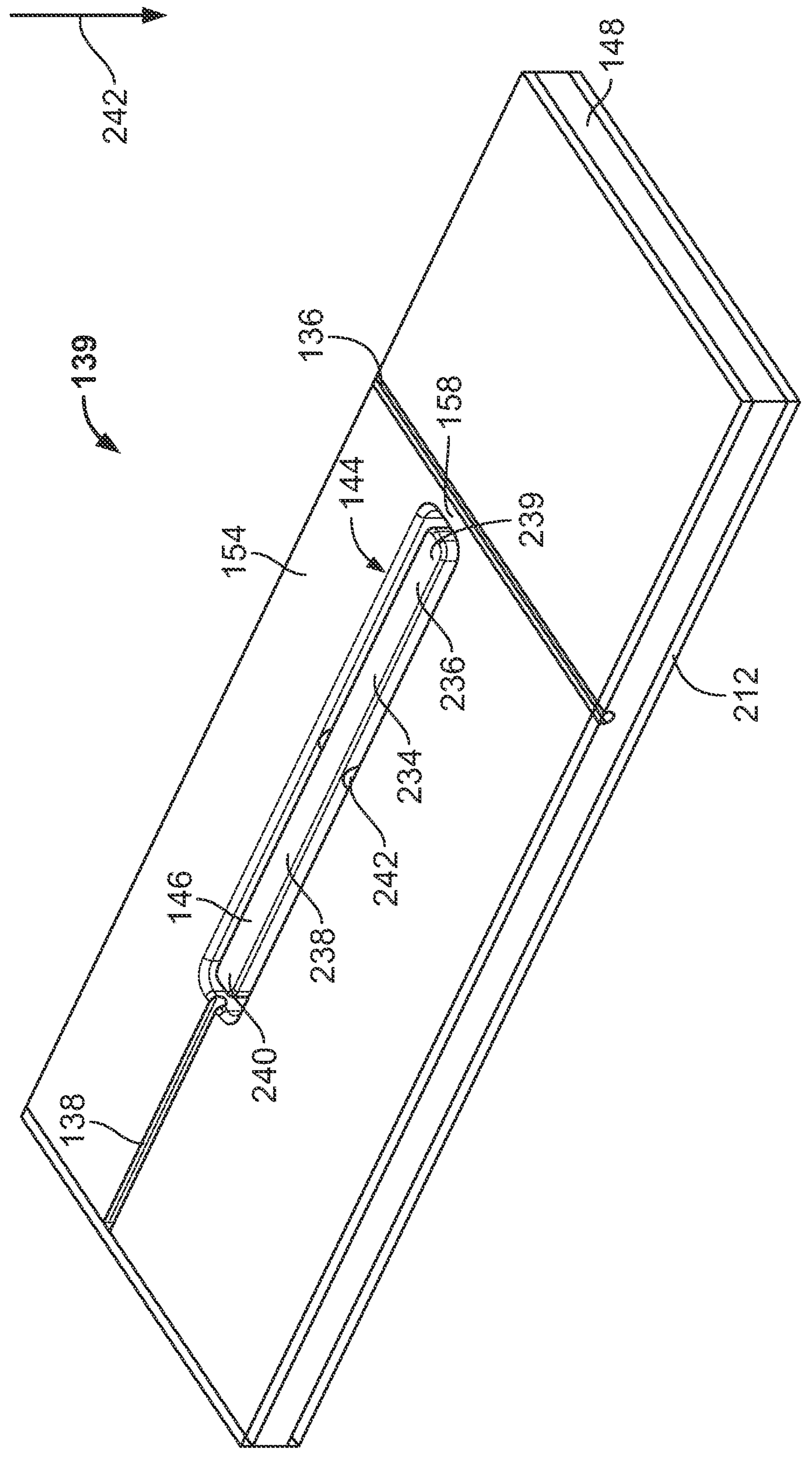
FIG. 16 is an isometric partially transparent view of another example implementation of the manifold assembly, the actuator, and the membrane valve of FIG. 1A.

FIG. 16 is an isometric partially transparent view of another example implementation of the manifold assembly 139, the actuator 146, and the membrane valve 144 of FIG. 1A. The manifold assembly 139 includes the manifold body 148 and the opposing membranes 154, 212 coupled to the manifold body 148. In the implementation shown, the actuator 146 is a pivot 234. The pivot 234 is shown disposed within the reagent fluidic line 138. The pivot 234 is elongate and has a generally rectangular profile. In some implementations, the pivot 234 is coupled to the manifold body 148 at approximately the midpoint of the pivot 234 such that the pivot 234 can rotate about the coupling relative to the manifold body 148. The pivot 234 includes a first pivot portion 236 and a second pivot portion 238. The first pivot portion 236 includes a distal end 239. The second pivot portion 238 includes a proximal end 240. The distal end 239 of the pivot 234 may be adapted to move the membrane 154 away from the valve seat 158. For example, moving the proximal end 240 of the pivot 234 in a direction generally indicated by arrow 242 may cause the distal end 239 of the pivot 234 to move in a direction generally opposite that of arrow 242 and correspondingly move the membrane 154 away from the valve seat 158.

Figure 17:
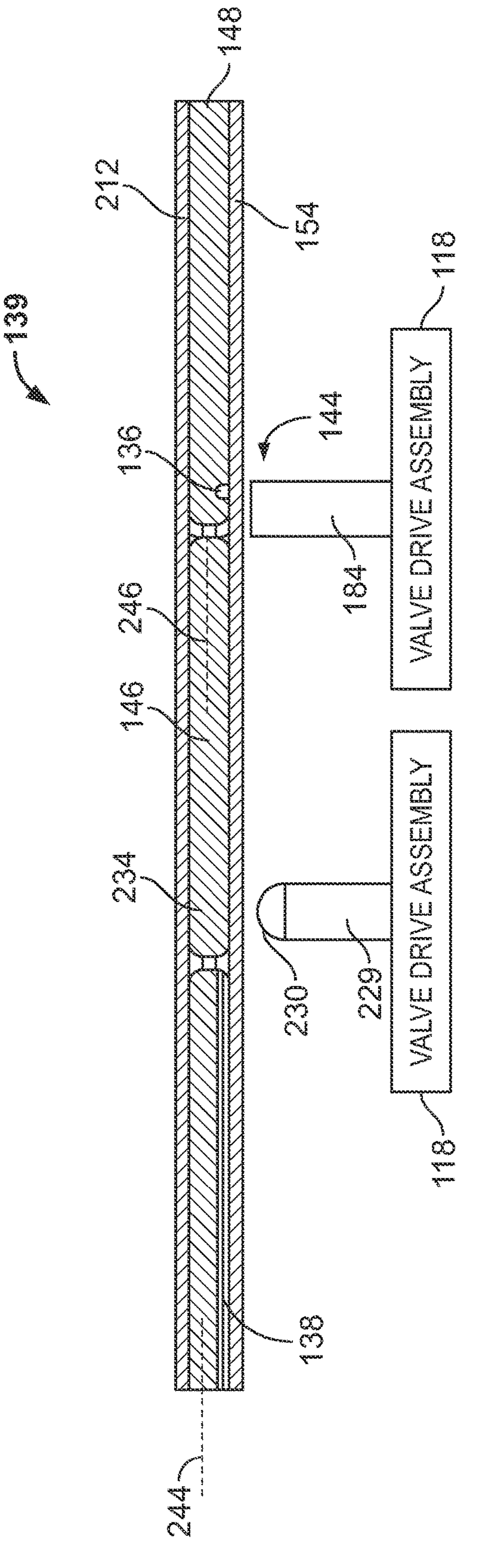
FIG. 17 is a cross-sectional view of the manifold assembly of FIG. 16 and another example implementation of the valve drive assembly of FIG. 1A with the membrane valve in the closed position.

FIG. 17 is a cross-sectional view of the manifold assembly 139 of FIG. 16 and another example implementation of the valve drive assembly 118 of FIG. 1A with the membrane valve 144 in the closed position. In the implementation shown, the valve drive assembly 118 includes portions on the same side of the manifold assembly 139. Thus, the valve drive assembly 118 is adapted to interface with the membrane valve 144 and to interface with the actuator 146 on the same side of the manifold assembly 139.

The membrane valve 144 is shown in the closed position with the valve plunger 184 in the extended position urging the membrane 154 against the valve seat 158. The pivot 234 is shown non-actuated. In the non-actuated position, a central axis 244 of the manifold body 148 is substantially collinear with a central axis 246 of the pivot 234.

Figure 18:
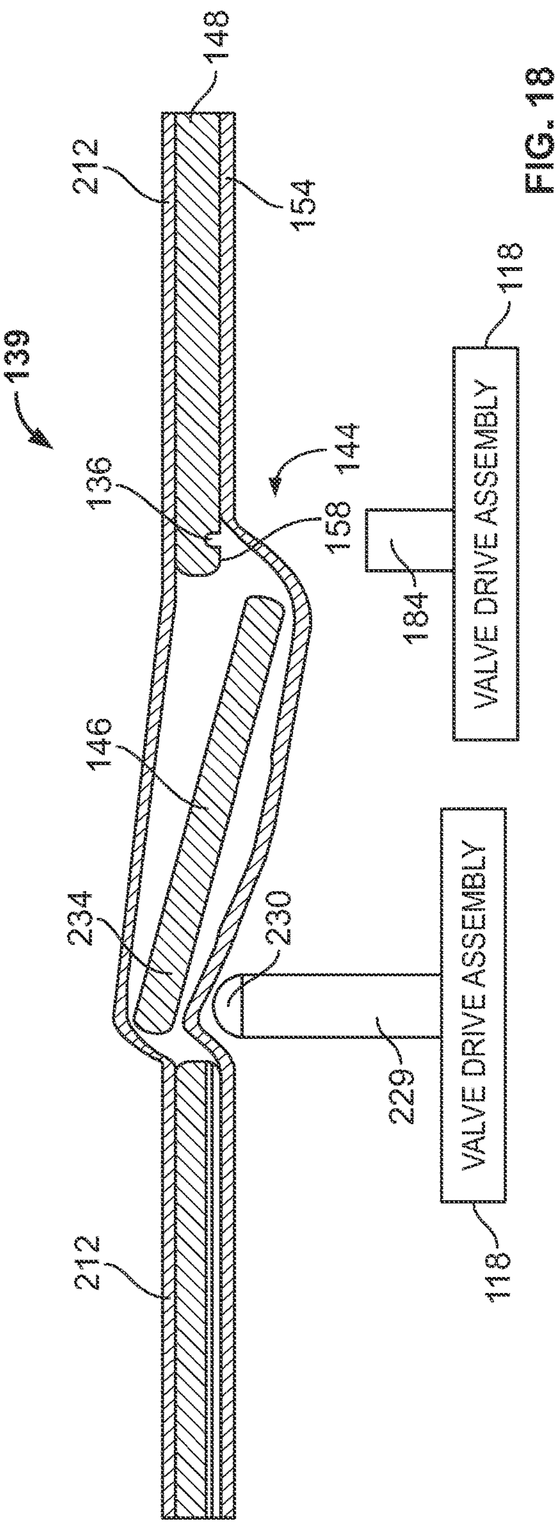
FIG. 18 is a cross-sectional view of the manifold assembly and the valve drive assembly of FIG. 17 with the actuator in the actuated position and the membrane valve in the open position.

FIG. 18 is a cross-sectional view of the manifold assembly 139 and the valve drive assembly 118 of FIG. 17 with the actuator 146 in the actuated position and the membrane valve 144 in the open position. In the implementation shown, the actuator plunger 229 is in the extended position engaging the membrane 212 and urging the actuator 146 to move the opposing membrane 154 away from the valve seat 158. To allow the membrane 154 to move away from the valve seat 158, the valve plunger 184 is shown in the retracted position.

Figure 19:
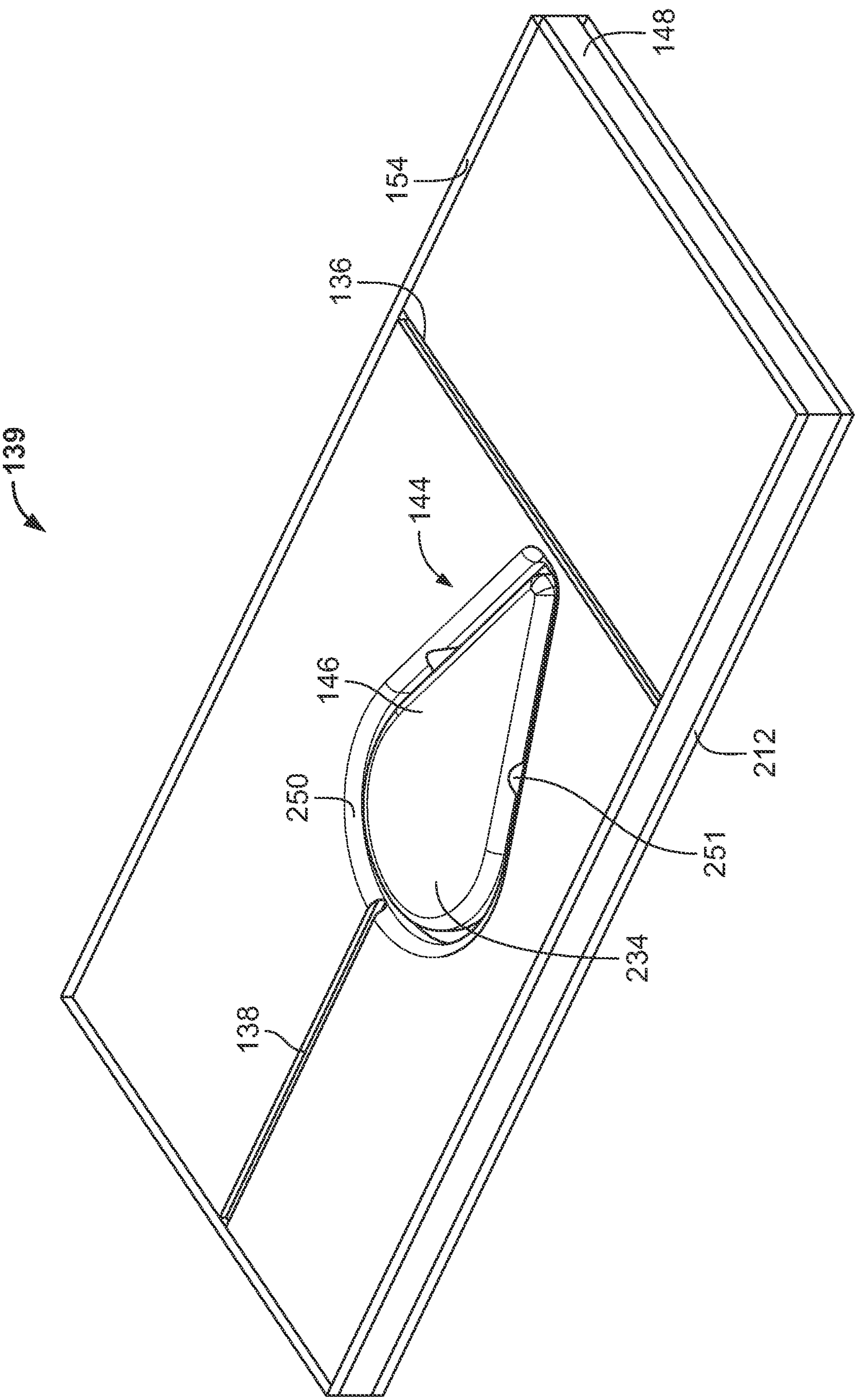
FIG. 19 is an isometric partially transparent view of another example implementation of the manifold assembly, the actuator, and the membrane valve of FIG. 1A.

FIG. 19 is an isometric partially transparent view of another example implementation of the manifold assembly 139, the actuator 146, and the membrane valve 144 of FIG. 1A. The manifold assembly 139 of FIG. 19 is similar to the manifold assembly of FIG. 16. In contrast, the pivot 234 of FIG. 19 is tear-drop shaped. As a result, the manifold body 148 defines a tear-drop shaped bore 250. The pivot 234 is disposed in and rotatable relative to the tear-drop shaped bore 250 about a pin 251. The pin 251 may be a separate component or may simply be an attachment point that rotationally flexes while remaining attached to the manifold body 148.

Figure 20:
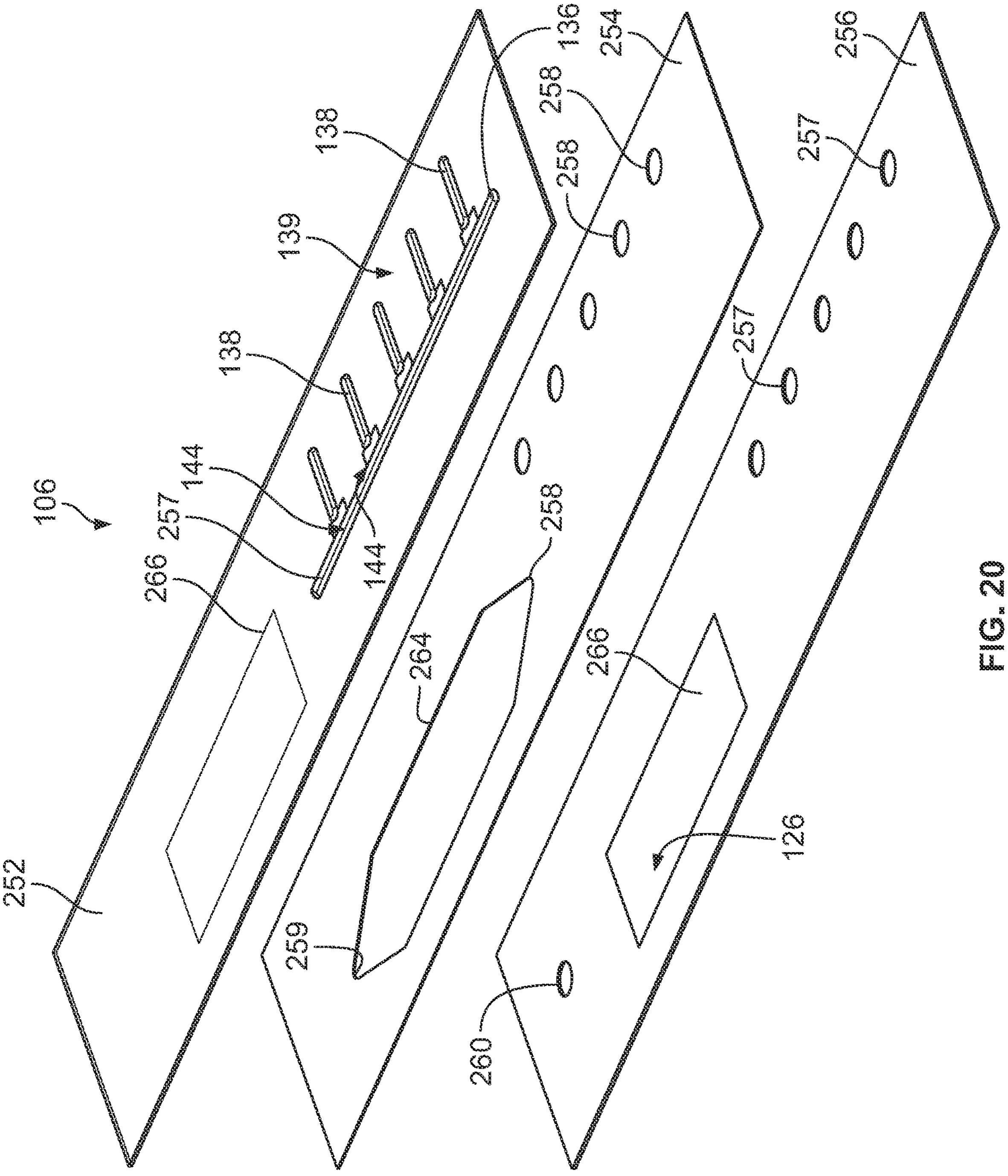
FIG. 20 is an isometric expanded view of an example implementation of the flow cell assembly of FIG. 1A.

FIG. 20 is an isometric expanded view of an example implementation of the flow cell assembly 106 of FIG. 1A. In the implementation shown, the flow cell assembly 106 includes a plurality of laminate layers 252, 254, 256. While three layers are shown, another number of layers may be included instead (e.g., 2, 4, 5, etc.). The laminate layers 252, 254, 256 may be flexible. The laminate layers 252, 254, 256 form a flow cell inlet 257, 258, a flow cell outlet 259, 260, an example implementation of the flow cell 126, and an example implementation of the manifold assembly 139. When the layers 252, 254, 256 are coupled, the flow cell inlet 257 of the outer layer 252 aligns with the flow cell inlet 258 of the middle layer 254. Similarly, when the layers 252, 254, 256 are coupled, the flow cell outlet 259 of the middle layer 254 aligns with the flow cell outlet 259 of the outer layer 256.

The flow cell 126 includes an opening 264 and micro-structures 266. The micro-structures 266 may also be implemented by nanostructures. The opening 264 may be defined by the middle layer 254. The opening 264 is shown being diamond shaped. Other shapes for the opening 264 may prove suitable.

One or more of the outer layers 252, 256 may include the microstructures or nano-structures 266. The microstructures 266 may include wells, channels, etc. where analysis and/or operations may take place. The microstructures 266 may be formed by a nanoimprint lithography pattern or by embossing (e.g., meso-scale channel embossing). Other methods of forming the microstructures 266 and/or the fluidic lines 136 and/or 138 may prove suitable. For example, thermoforming may be used. Such an approach may allow for the common fluidic line 136 to be formed with a larger cross-section and with lower impedance. In some implementations, the reagent fluidic line 138 and/or the common fluidic line 136 is approximately 0.5 millimeters (mm) deep. However, other depths may prove suitable. For example, the depth may be approximately 0.3 mm, approximately 0.35 mm, approximately 0.46 mm, approximately 0.66 mm, etc.

The manifold assembly 139 includes the common fluidic line 136 and the plurality of reagent fluidic lines 138. Each reagent fluidic line 138 is adapted to be coupled to a corresponding reagent reservoir 142. The plurality of membrane valves 144 fluidically couples the common fluidic line 136 and each of the reagent fluidic lines 138.

Figure 21:
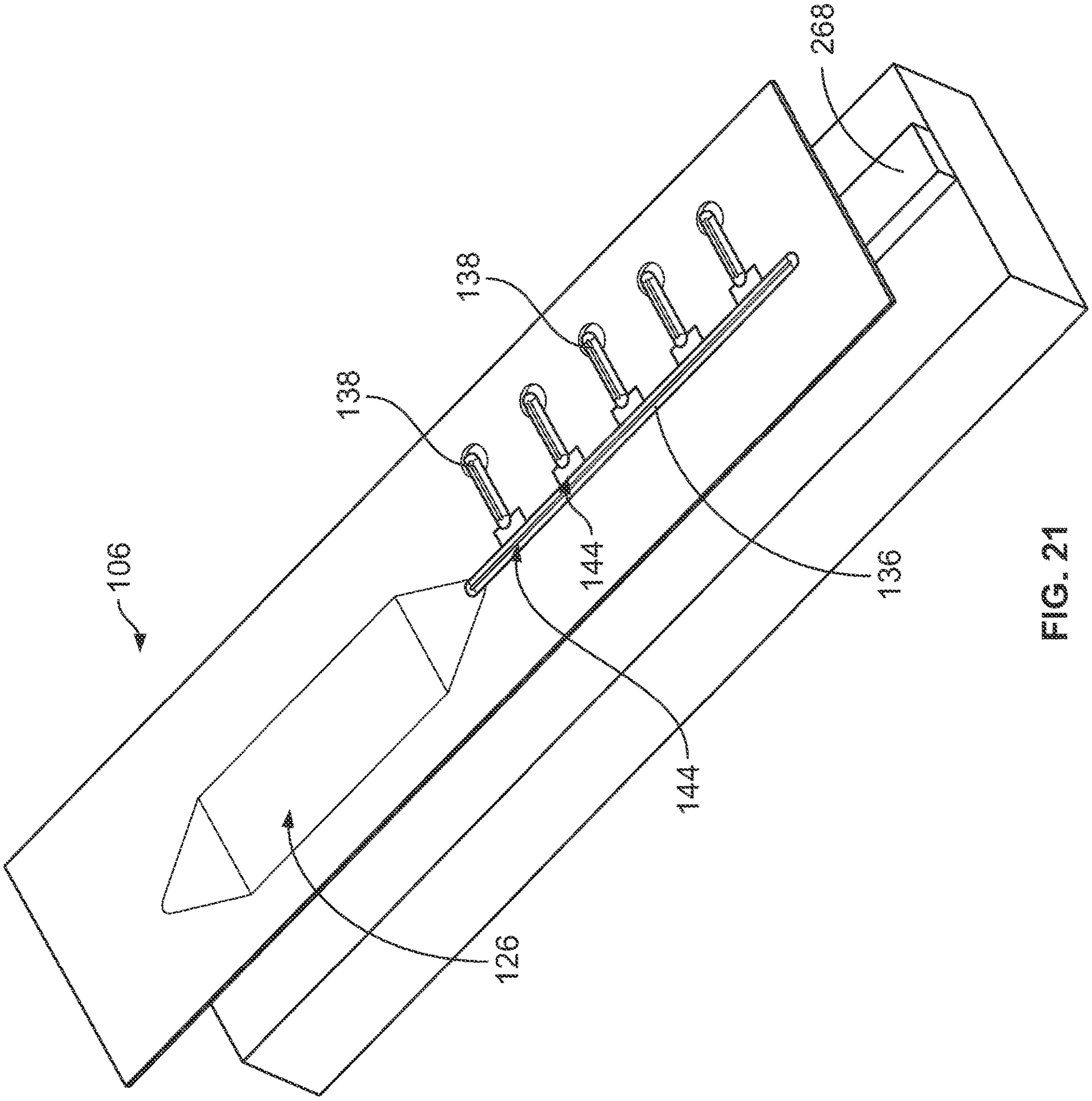
FIG. 21 is another isometric view of the flow cell assembly of FIG. 20 showing the laminate layers coupled together and a support that may be adapted to support the membrane valves.

FIG. 21 is another isometric view of the flow cell assembly 106 of FIG. 20 showing the laminate layers 252, 254, 256 coupled together and a support 268 that may be adapted to support the membrane valves 144. The layers 252, 254, 256 may be coupled together using pressure-sensitive adhesive (PSA), laser bonding, or thermal fusion. Other approaches of coupling the layers 252, 254, 256 may prove suitable. In the implementation shown, the flow cell assembly 106 includes the reagent fluidic lines 138, the common fluidic line 136, and the flow cell 126.

The support 268 may be provided to support the manifold assembly 139 when the membrane valves 144 are actuated because the membrane valves 144 of FIG. 20 are formed of the layers 252, 254, 256. The support 268 may be provided by the reagent cartridge body 140 and/or the housing 124 of the flow cell assembly 106. The support 268 may be a ledge or other flat structure against which the membrane valves 144 are pressed. For example, the support 268 may resemble the protrusion 180 and may be positioned adjacent (e.g., immediately adjacent) the membrane valves 144.

Figure 22:
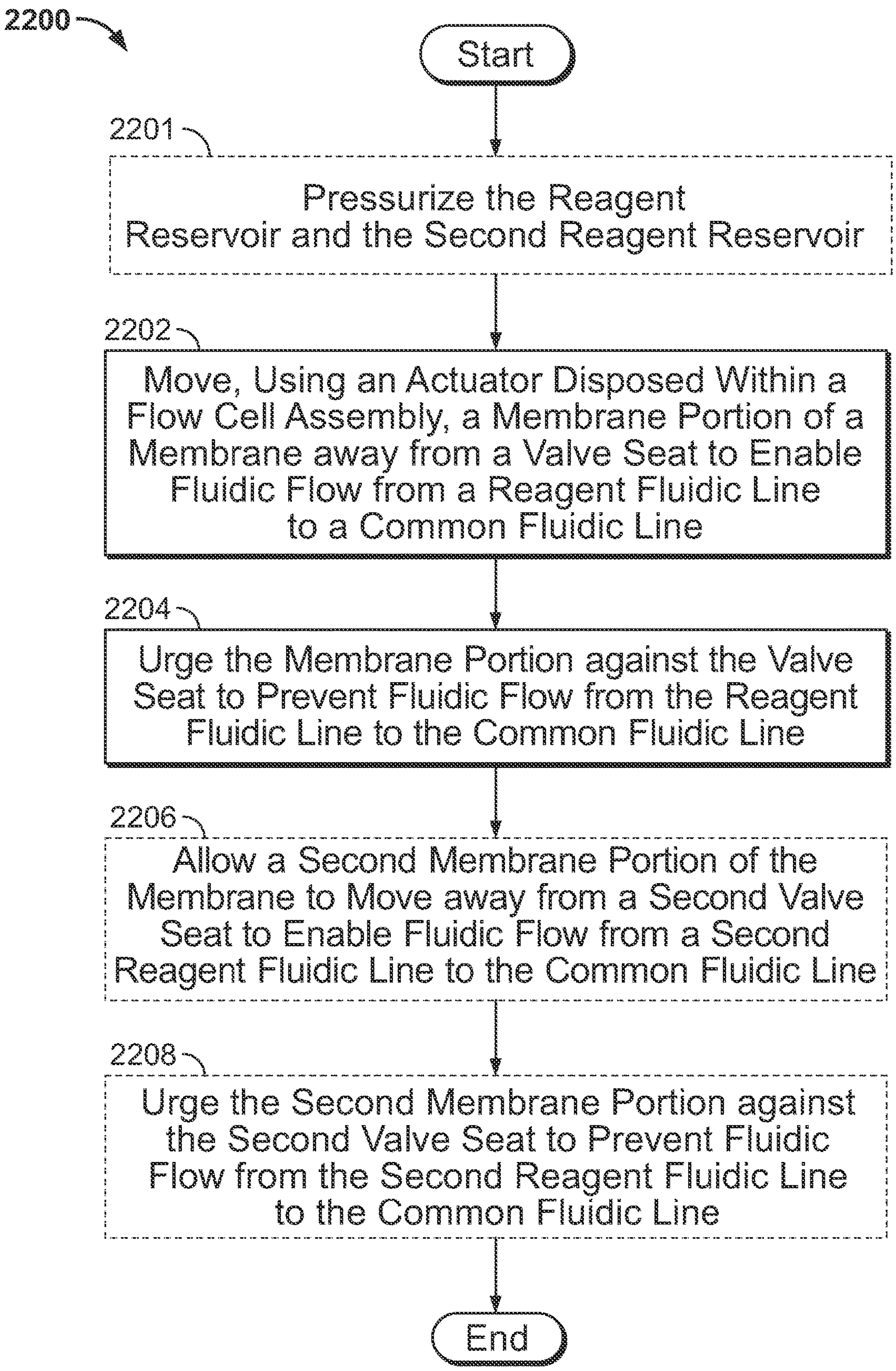
FIG. 22 illustrates a flowchart for a method of actuating the actuator of the flow cell assembly of FIG. 1A or any of the other implementations disclosed herein.
Figure 23:
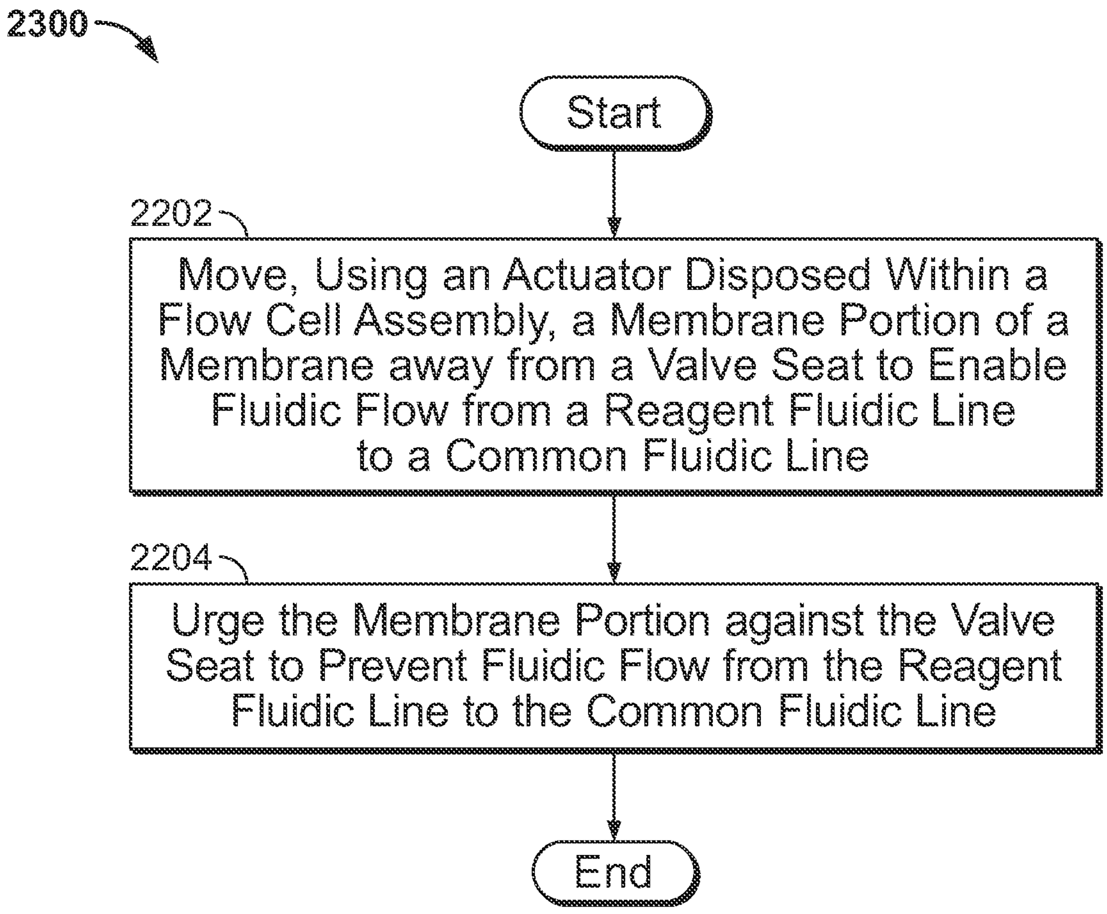
FIG. 23 illustrates a flowchart for a method of actuating the actuator of the flow cell assembly of FIG. 1A or any of the other implementations disclosed herein.

FIGS. 22 and 23 illustrate flowcharts for a method of actuating the actuator 146 of the flow cell assembly 106 of FIG. 1A or any of the other implementations disclosed herein. In the flow chart of FIG. 22, the blocks surrounded by solid lines may be included in an implementation of a process 2200 while the blocks surrounded in dashed lines may be optional in the implementation of the process 2200. However, regardless of the way the border of the blocks is presented in FIGS. 22 and 23, the order of execution of the blocks may be changed, and/or some of the blocks described may be changed, eliminated, combined and/or subdivided into multiple blocks.

A process 2200 of FIG. 22 begins by pressurizing the reagent reservoir 142 (block 2201). A membrane portion 157 of the membrane 154 is moved, using the actuator 146 disposed within the flow cell assembly 106, away from a valve seat 158 to enable fluidic flow from a reagent fluidic line 138 to a common fluidic line 136 (block 2202). The membrane portion 127 and the valve seat 158 form the membrane valve 144. The reagent fluidic line 138 is fluidically coupled to the reagent reservoir 142. The common fluidic line 136 is fluidically coupled to the flow cell 126. The common fluidic line 136 has a common central axis 176 and the reagent fluidic line 138 has a reagent central axis 178 that is non-collinear with the common central axis 176. The membrane portion 127 is urged against the valve seat 158 to prevent fluidic flow from the reagent fluidic line 138 to the common fluidic line 136 (block 2204).

A second membrane portion 127 of the membrane 154 is allowed to move away from a second valve seat 158 to enable fluidic flow from a second reagent fluidic line 138 to the common fluidic line 136 (block 2206). The second membrane portion 127 and the second valve seat 158 form a second membrane valve 144. The second reagent fluidic line 138 is coupled to a second reagent reservoir 142. The second reagent fluidic line 138 has a reagent central axis 178 that is non-collinear with the common central axis 176. The second membrane portion 127 is urged against the second valve seat 158 to prevent fluidic flow from the second reagent fluidic line 138 to the common fluidic line 136 (block 2208).

A process 2300 of FIG. 23 begins by moving, using the actuator 146 disposed within the flow cell assembly 106, a membrane portion 157 of the membrane 154 away from a valve seat 158 to enable fluidic flow from a reagent fluidic line 138 to a common fluidic line 136 (block 2202). The membrane portion 127 and the valve seat 158 form the membrane valve 144. The reagent fluidic line 138 is fluidically coupled to the reagent reservoir 142. The common fluidic line 136 is fluidically coupled to the flow cell 126. The common fluidic line 136 has a common central axis 176 and the reagent fluidic line 138 has a reagent central axis 178 that is non-collinear with the common central axis 176. The membrane portion 127 is urged against the valve seat 158 to prevent fluidic flow from the reagent fluidic line 138 to the common fluidic line 136 (block 2204).

A method, comprising: moving, using an actuator disposed within a flow cell assembly, a membrane portion of a membrane away from a valve seat to enable fluidic flow from a reagent fluidic line to a common fluidic line, the membrane portion and the valve seat forming a membrane valve, the reagent fluidic line being fluidically coupled to a reagent reservoir, the common fluidic line being fluidically coupled to a flow cell, the common fluidic line has a common central axis and the reagent fluidic line has a reagent central axis that is non-collinear with the common central axis; and urging the membrane portion against the valve seat to prevent fluidic flow from the reagent fluidic line to the common fluidic line.

A method, comprising: moving, using an actuator disposed within a manifold assembly, a membrane portion of a membrane of the manifold assembly away from a valve seat to enable fluidic flow from a reagent fluidic line to a common fluidic line, the membrane portion and the valve seat forming a membrane valve, the reagent fluidic line being fluidically coupled to a reagent reservoir, the common fluidic line being fluidically coupled to a flow cell, the common fluidic line has a common central axis and the reagent fluidic line has a reagent central axis that is non-collinear with the common central axis; and urging the membrane portion against the valve seat to prevent fluidic flow from the reagent fluidic line to the common fluidic line.

The method of any one or more of the preceding implementations and/or any one or more of the implementations disclosed below, further comprising: allowing a second membrane portion of the membrane to move away from a second valve seat to enable fluidic flow from a second reagent fluidic line to the common fluidic line, the second membrane portion and the second valve seat forming a second membrane valve, the second reagent fluidic line being coupled to a second reagent reservoir, the second reagent fluidic line having a reagent central axis that is non-collinear with the common central axis; and urging the second membrane portion against the second valve seat to prevent fluidic flow from the second reagent fluidic line to the common fluidic line.

The method of any one or more of the preceding implementations and/or any one or more of the implementations disclosed below, the actuator comprises a pivot having a distal end that is adapted to move the membrane away from the valve seat.

The method of any one or more of the preceding implementations and/or any one or more of the implementations disclosed below, wherein the actuator is a cantilever having a distal end that is adapted to move the membrane away from the valve seat.

The method of any one or more of the preceding implementations and/or any one or more of the implementations disclosed below, further comprising pressurizing the reagent reservoir.

A system, comprising: a valve drive assembly; a reagent cartridge comprising: a common fluidic line; and a plurality of reagent fluidic lines, each of the plurality of reagent fluidic lines being adapted to be coupled to a corresponding reagent reservoir; and a manifold assembly comprising a plurality of membrane valves and a plurality of actuators disposed within the manifold assembly, the manifold assembly selectively fluidically coupling the common fluidic line and a corresponding one of the plurality of reagent fluidic lines responsive to the valve drive assembly actuating a corresponding one of the plurality of actuators, each of the plurality of membrane valves is formed between the common fluidic line and a corresponding reagent fluidic line, wherein the valve drive assembly is adapted to interface with the actuators and the plurality of membrane valves to selectively control a flow of reagent between each of the plurality of reagent fluidic lines and the common fluidic line.

The apparatus of any one or more of the preceding implementations and/or any one or more of the implementations disclosed below, wherein the manifold assembly comprises a manifold body defining a portion of the common fluidic line and a portion of the reagent fluidic lines and a membrane coupled to portions of the manifold body, the membrane valves being formed by the membrane and the manifold body.

The apparatus of any one or more of the preceding implementations and/or any one or more of the implementations disclosed below, wherein the manifold body comprises a valve seat disposed between the portions of the manifold body.

The apparatus of any one or more of the preceding implementations and/or any one or more of the implementations disclosed below, wherein the valve seat is formed by a protrusion against which the membrane is adapted to engage.

The apparatus of any one or more of the preceding implementations and/or any one or more of the implementations disclosed below, wherein the protrusion separates the common fluidic line and the corresponding one of the plurality of reagent fluidic lines.

The apparatus of any one or more of the preceding implementations and/or any one or more of the implementations disclosed below, wherein the membrane is moveable relative to the valve seat.

The apparatus of any one or more of the preceding implementations and/or any one or more of the implementations disclosed below, wherein the valve drive assembly is adapted to interface with the membrane and to drive the membrane against the valve seat to close a corresponding one of the plurality of membrane valves.

The apparatus of any one or more of the preceding implementations and/or any one or more of the implementations disclosed below, further comprising a shut-off valve to control the flow between at least one of the plurality of reagent fluidic lines and the common fluidic line.

The apparatus of any one or more of the preceding implementations and/or any one or more of the implementations disclosed below, wherein the reagent cartridge comprises the manifold assembly.

The apparatus of any one or more of the preceding implementations and/or any one or more of the implementations disclosed below, wherein the reagent cartridge comprises a plurality of reagent reservoirs each fluidically coupled to the plurality of reagent fluidic lines.

The apparatus of any one or more of the preceding implementations and/or any one or more of the implementations disclosed below, wherein the system comprises a pressure source selectively fluidically coupled to at least one of the plurality of reagent reservoirs.

The apparatus of any one or more of the preceding implementations and/or any one or more of the implementations disclosed below, wherein the common fluidic line has a common central axis and each of the reagent fluidic lines have a reagent central axis that is non-collinear with the common central axis.

The apparatus of any one or more of the preceding implementations and/or any one or more of the implementations disclosed below, wherein the valve drive assembly comprises a plurality of plungers.

The apparatus of any one or more of the preceding implementations and/or any one or more of the implementations disclosed below, wherein the valve drive assembly comprises a pressure source adapted to actuate a corresponding one of the plurality of membrane valves.

The apparatus of any one or more of the preceding implementations and/or any one or more of the implementations disclosed below, wherein the valve drive assembly comprises one or more plungers coupled to the membrane via a snap fit connection or a magnetic connection.

The apparatus of any one or more of the preceding implementations and/or any one or more of the implementations disclosed below, wherein the plurality of membrane valves are arranged arcuately about the common fluidic line.

An apparatus, comprising: a common fluidic line; and a plurality of reagent fluidic lines, each of the plurality of reagent fluidic lines being adapted to be coupled to a corresponding reagent reservoir; and a manifold assembly comprising a plurality of membrane valves and a plurality of actuators disposed within the manifold assembly, the manifold assembly selectively fluidically coupling the common fluidic line, a corresponding one of the plurality of reagent fluidic lines responsive to actuation of a corresponding one of the plurality of actuators, each of the plurality of membranes valve is formed between the common fluidic line and a corresponding one of the plurality of reagent fluidic lines.

The apparatus of any one or more of the preceding implementations and/or any one or more of the implementations disclosed below, wherein the manifold assembly comprises a manifold body and opposing membranes coupled to the manifold body, the manifold body defining a portion of the common fluidic line, a portion of the plurality of reagent fluidic lines, and a plurality of valve seats that each separate the common fluidic line and a corresponding one of the plurality of reagent fluidic lines.

The apparatus of any one or more of the preceding implementations and/or any one or more of the implementations disclosed below, wherein at least one of the plurality of actuators is a cantilever having a distal end that is adapted to move one of the opposing membranes away from a corresponding valve seat of one of the plurality of membrane valves.

The apparatus of any one or more of the preceding implementations and/or any one or more of the implementations disclosed below, wherein the plurality of actuators are positioned between the opposing membranes.

The apparatus of any one or more of the preceding implementations and/or any one or more of the implementations disclosed below, further comprising a valve drive assembly adapted to interface with each of the plurality of actuators to move a corresponding membrane of a corresponding one of the plurality of membranes away from a corresponding valve seat.

The apparatus of any one or more of the preceding implementations and/or any one or more of the implementations disclosed below, wherein the valve drive assembly is adapted to interface with a corresponding one of the plurality of membrane valves on a first side of the manifold assembly and to interface with a corresponding one of the plurality of actuators on a second side of the manifold assembly.

The apparatus of any one or more of the preceding implementations and/or any one or more of the implementations disclosed below, wherein the manifold assembly comprises a manifold body that defines a receptacle adjacent each of the plurality of actuators, the receptacles adapted to guide the valve drive assembly into engagement with the corresponding one of the plurality of actuators.

The apparatus of any one or more of the preceding implementations and/or any one or more of the implementations disclosed below, further comprising an indexer adapted to move the valve drive assembly to interface with different ones of the plurality of actuators.

The apparatus of any one or more of the preceding implementations and/or any one or more of the implementations disclosed below, wherein one of the plurality of actuators comprises a pivot having a distal end that is adapted to move a corresponding membrane away from a corresponding valve seat.

The apparatus of any one or more of the preceding implementations and/or any one or more of the implementations disclosed below, wherein the manifold assembly is part of a flow cell assembly.

The apparatus of any one or more of the preceding implementations and/or any one or more of the implementations disclosed below, wherein the flow cell assembly comprises a plurality of layers and wherein the manifold assembly is defined by or between one or more of the plurality of layers.

The apparatus of any one or more of the preceding implementations and/or any one or more of the implementations disclosed below, wherein the flow cell assembly comprises a plurality of laminate layers and wherein the manifold assembly is defined by or between one or more of the plurality of layers.

An apparatus, comprising: a flow cell assembly comprising a plurality of laminate layers that form a flow cell inlet, a flow cell outlet, a flow cell, and a manifold assembly, the manifold assembly, comprising: a common fluidic line; a plurality of reagent fluidic lines, each of the plurality of reagent fluidic lines being adapted to be fluidically coupled to a corresponding reagent reservoir; and a plurality of membrane valves selectively fluidically coupling the common fluidic line and a corresponding one of the plurality of reagent fluidic lines.

The apparatus of any one or more of the preceding implementations and/or any one or more of the implementations disclosed below, wherein the common fluidic line and the plurality of reagent fluidic lines are defined by or between one or more of the plurality of laminate layers.

The apparatus of any one or more of the preceding implementations and/or any one or more of the implementations disclosed below, wherein one or more of the plurality of laminate layers comprise micro-structures or nano-structures.

The apparatus of any one or more of the preceding implementations and/or any one or more of the implementations disclosed below, wherein the flow cell comprises a pattern defined by one or more of the plurality of laminate layers.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to “one implementation” are not intended to be interpreted as excluding the existence of additional implementations that also incorporate the recited features. Moreover, unless explicitly stated to the contrary, implementations “comprising,” “including,” or “having” an element or a plurality of elements having a particular property may include additional elements whether or not they have that property. Moreover, the terms “comprising,” including,” having,” or the like are interchangeably used herein.

The terms “substantially,” “approximately,” and “about” used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A method, comprising:

moving, using an actuator disposed within a manifold assembly, a membrane portion of a membrane of the manifold assembly away from a valve seat to enable fluidic flow from a reagent fluidic line to a common fluidic line, the membrane portion and the valve seat forming a membrane valve, the reagent fluidic line being fluidically coupled to a reagent reservoir, the common fluidic line being fluidically coupled to a flow cell, the common fluidic line has a common central axis and the reagent fluidic line has a reagent central axis that is non-collinear with the common central axis, wherein the actuator comprises a pivot having a distal end that is adapted to move the membrane away from the valve seat; and urging the membrane portion against the valve seat to prevent fluidic flow from the reagent fluidic line to the common fluidic line.

2. The method of claim 1, further comprising:

allowing a second membrane portion of the membrane to move away from a second valve seat to enable fluidic flow from a second reagent fluidic line to the common fluidic line, the second membrane portion and the second valve seat forming a second membrane valve, the second reagent fluidic line being coupled to a second reagent reservoir, the second reagent fluidic line having a reagent central axis that is non-collinear with the common central axis; and urging the second membrane portion against the second valve seat to prevent fluidic flow from the second reagent fluidic line to the common fluidic line.

3. The method of claim 1, wherein the actuator is a cantilever having a distal end that is adapted to move the membrane away from the valve seat.

4. The method of claim 1, further comprising pressurizing the reagent reservoir.

5. A system, comprising:

a valve drive assembly;

a reagent cartridge comprising:

a common fluidic line; and a plurality of reagent fluidic lines, each of the plurality of reagent fluidic lines being adapted to be coupled to a corresponding reagent reservoir; and a manifold assembly comprising a plurality of membrane valves and a plurality of actuators disposed within the manifold assembly, the manifold assembly selectively fluidically coupling the common fluidic line and a corresponding one of the plurality of reagent fluidic lines responsive to the valve drive assembly actuating a corresponding one of the plurality of actuators, each of the plurality of membrane valves is formed between the common fluidic line and a corresponding reagent fluidic line, wherein each of the actuators comprises a pivot having a distal end that is adapted to move a membrane portion of a membrane of the manifold assembly away from a valve seat of the manifold assembly, wherein the valve drive assembly is adapted to interface with the actuators and the plurality of membrane valves to selectively control a flow of reagent between each of the plurality of reagent fluidic lines and the common fluidic line.

6. The system of claim 5, wherein the manifold assembly comprises a manifold body defining a portion of the common fluidic line and a portion of the reagent fluidic lines and the membrane coupled to portions of the manifold body, the membrane valves being formed by the membrane and the manifold body.

7. The system of claim 6, wherein the manifold body comprises the valve seat disposed between the portions of the manifold body.

8. The system of claim 7, wherein the valve seat is formed by a protrusion against which the membrane is adapted to engage.

9. The system of claim 8, wherein the protrusion separates the common fluidic line and the corresponding one of the plurality of reagent fluidic lines.

10. The system of claim 8, wherein the membrane is moveable relative to the valve seat.

11. The system of claim 7, wherein the valve drive assembly is adapted to interface with the membrane and to drive the membrane against the valve seat to close a corresponding one of the plurality of membrane valves.

12. The system of claim 7, further comprising a shut-off valve to control the flow between at least one of the plurality of reagent fluidic lines and the common fluidic line.

13. The system of claim 7, wherein the reagent cartridge comprises the manifold assembly.

14. The system of claim 5, wherein the reagent cartridge comprises a plurality of reagent reservoirs each fluidically coupled to the plurality of reagent fluidic lines.

15. The system of claim 14, wherein the system comprises a pressure source selectively fluidically coupled to at least one of the plurality of reagent reservoirs.

16. The system of claim 5, wherein the common fluidic line has a common central axis and each of the reagent fluidic lines have a reagent central axis that is non-collinear with the common central axis.

17. The system of claim 5, wherein the valve drive assembly comprises a plurality of plungers.

18. The system of claim 5, wherein the valve drive assembly comprises a pressure source adapted to actuate a corresponding one of the plurality of membrane valves.

19. The system of claim 5, wherein the valve drive assembly comprises one or more plungers coupled to the membrane via a snap fit connection or a magnetic connection.

20. The system of claim 5, wherein the plurality of membrane valves are arranged arcuately about the common fluidic line.

21. An apparatus, comprising:

a common fluidic line;

a plurality of reagent fluidic lines, each of the plurality of reagent fluidic lines being adapted to be coupled to a corresponding reagent reservoir; and a manifold assembly comprising a plurality of membrane valves and a plurality of actuators disposed within the manifold assembly, the manifold assembly selectively fluidically coupling the common fluidic line, a corresponding one of the plurality of reagent fluidic lines responsive to actuation of a corresponding one of the plurality of actuators, each of the plurality of membrane valves is formed between the common fluidic line and a corresponding one of the plurality of reagent fluidic lines, wherein at least one of the plurality of actuators is a cantilever having a distal end that is adapted to move one of opposing membranes of the manifold assembly away from a corresponding valve seat of one of the plurality of membrane valves.

22. The apparatus of claim 21, wherein the manifold assembly comprises a manifold body and the opposing membranes coupled to the manifold body, the manifold body defining a portion of the common fluidic line, a portion of the plurality of reagent fluidic lines, and a plurality of valve seats that each separate the common fluidic line and a corresponding one of the plurality of reagent fluidic lines.

23. The apparatus of claim 22, wherein the plurality of actuators are positioned between the opposing membranes.

24. The apparatus of claim 22, further comprising a valve drive assembly adapted to interface with each of the plurality of actuators to move a corresponding membrane of a corresponding one of the plurality of membranes away from a corresponding valve seat.

25. The apparatus of claim 24, wherein the valve drive assembly is adapted to interface with a corresponding one of the plurality of membrane valves on a first side of the manifold assembly and to interface with a corresponding one of the plurality of actuators on a second side of the manifold assembly.

26. The apparatus of claim 24, wherein the manifold assembly comprises a manifold body that defines a receptacle adjacent each of the plurality of actuators, the receptacles adapted to guide the valve drive assembly into engagement with the corresponding one of the plurality of actuators.

27. The apparatus of claim 24, further comprising an indexer adapted to move the valve drive assembly to interface with different ones of the plurality of actuators.

28. The apparatus of claim 21, wherein one of the plurality of actuators comprises a pivot having a distal end that is adapted to move a corresponding membrane away from a corresponding valve seat.

29. The apparatus of claim 21, wherein the manifold assembly is part of a flow cell assembly.

30. The apparatus of claim 29, wherein the flow cell assembly comprises a plurality of layers and wherein the manifold assembly is defined by or between one or more of the plurality of layers.

31. The apparatus of claim 29, wherein the flow cell assembly comprises a plurality of laminate layers and wherein the manifold assembly is defined by or between one or more of the plurality of layers.

* * * * *